(12) United States Patent
Masukawa et al.

(10) Patent No.: US 11,654,567 B2
(45) Date of Patent: May 23, 2023

(54) ROBOT SYSTEM AND CONTROL METHOD

(71) Applicant: Seiko Epson Corporation, Tokyo (JP)

(72) Inventors: Tomoyasu Masukawa, Sakata (JP); Yuji Shimada, Matsumoto (JP)

(73) Assignee: SEIKO EPSON CORPORATION

( * ) Notice: Subject to any disclaimer, the term of this patent is extended or adjusted under 35 U.S.C. 154(b) by 318 days.

(21) Appl. No.: 16/802,605

(22) Filed: Feb. 27, 2020

(65) Prior Publication Data

US 2020/0276712 A1 Sep. 3, 2020

(30) Foreign Application Priority Data

Feb. 28, 2019 (JP) .............................. JP2019-037008

(51) Int. Cl.
*B25J 9/16* (2006.01)
*B25J 15/00* (2006.01)

(52) U.S. Cl.
CPC ........... *B25J 9/1682* (2013.01); *B25J 9/1612* (2013.01); *B25J 9/1697* (2013.01); *B25J 15/0033* (2013.01)

(58) Field of Classification Search
CPC ...... B25J 9/1682; B25J 9/1612; B25J 9/1697; B25J 15/0033; B25J 9/1633; B25J 15/0253; B25J 19/023; B25J 9/1602; B25J 13/085; B25J 13/087; B25J 13/088; G05B 2219/39109; G05B 2219/39116
See application file for complete search history.

(56) References Cited

U.S. PATENT DOCUMENTS

| | | | | |
|---|---|---|---|---|
| 2004/0266276 A1* | 12/2004 | Hariki | .................... | H01R 43/26 439/894 |
| 2014/0012416 A1* | 1/2014 | Negishi | ................. | B25J 9/1607 700/251 |
| 2014/0156066 A1 | 6/2014 | Sakano | | |
| 2014/0277732 A1* | 9/2014 | Shiota | .................... | B25J 9/1697 700/258 |
| 2017/0312921 A1* | 11/2017 | Kobayashi | ............. | B25J 9/1633 |
| 2017/0361464 A1* | 12/2017 | Sasaki | .................... | B25J 9/1687 |
| 2018/0243907 A1* | 8/2018 | Takeyama | ............ | B25J 15/0253 |

FOREIGN PATENT DOCUMENTS

| | | |
|---|---|---|
| JP | H03-213286 A | 9/1991 |
| JP | H09-230922 A | 9/1997 |
| JP | 2014-108466 A | 6/2014 |
| JP | 2014-176917 A | 9/2014 |
| JP | 2014-231110 A | 12/2014 |
| JP | 2017-113853 A | 6/2017 |
| WO | 2018-193754 A1 | 10/2018 |

* cited by examiner

*Primary Examiner* — Adam R Mott
*Assistant Examiner* — Elizabeth Rose Neleski
(74) *Attorney, Agent, or Firm* — Harness, Dickey & Pierce, P.L.C.

(57) ABSTRACT

A robot system includes a robot including an arm, a control section configured to control operation of the robot, a gripping section coupled to the arm and configured to grip a cable, at one end of which a connector is provided, and a detecting section configured to detect contact of the gripping section and the connector. The control section causes the gripping section to perform first gripping for gripping the cable to restrict movement of the cable in a thickness direction of the cable, moves the gripping section toward the connector in a state in which the first gripping is performed, stops the movement of the gripping section based on a detection result of the detecting section, and causes the gripping section to perform second gripping for gripping the connector.

6 Claims, 18 Drawing Sheets

ROBOT SYSTEM AND CONTROL METHOD

The present application is based on, and claims priority from JP Application Serial Number 2019-037008, filed Feb. 28, 2019, the disclosure of which is hereby incorporated by reference herein in its entirety.

BACKGROUND

1. Technical Field

The present disclosure relates to a robot system and a control method.

2. Related Art

For example, JP A-2014-231110 (Patent Literature 1) discloses a robot system including an articulated robot and a controller that controls the articulated robot. An end effector that grips a connector attached to one end portion of a cable is attached to the articulated robot disclosed in Patent Literature 1. When the end effector grips the connector, the robot system disclosed in Patent Literature 1 captures an image of the connector with an imaging section in advance and moves the end effector based on a result of the capturing of the image to grip the connector.

However, the method explained above takes time to capture an image and specify the connector from a result of the capturing of the image. Further, it is likely that the end effector cannot accurately grip the connector depending on imaging accuracy, image quality, and the like of the imaging section.

SUMMARY

The present disclosure can be implemented as the following application examples.

A robot system according to an application example includes: a robot including an arm; a control section configured to control operation of the robot; a gripping section coupled to the arm and configured to grip a cable, at one end of which a connector is provided; and a detecting section configured to detect contact of the gripping section and the connector. The control section causes the gripping section to perform first gripping for gripping the cable to restrict movement of the cable in a thickness direction of the cable, moves the gripping section toward the connector in a state in which the first gripping is performed, stops the movement of the gripping section based on a detection result of the detecting section, and causes the gripping section to perform second gripping for gripping the connector.

A control method according to an application example is a control method for a robot system including: a robot including an arm; a gripping section coupled to the arm and configured to grip a cable, at one end of which a connector is provided; and a detecting section configured to detect contact of the gripping section and the connector, the control method including: performing first gripping for gripping, with the gripping section, the cable to restrict movement of the cable in a thickness direction of the cable; moving the gripping section toward the connector in a state in which the first gripping is performed; stopping the movement of the gripping section based on a detection result of the detecting section; and performing second gripping for gripping the connector with the gripping section.

DESCRIPTION OF EXEMPLARY EMBODIMENTS

A robot system and a control method according to the present disclosure are explained in detail below based on preferred embodiments shown in the accompanying drawings.

Figure 1:
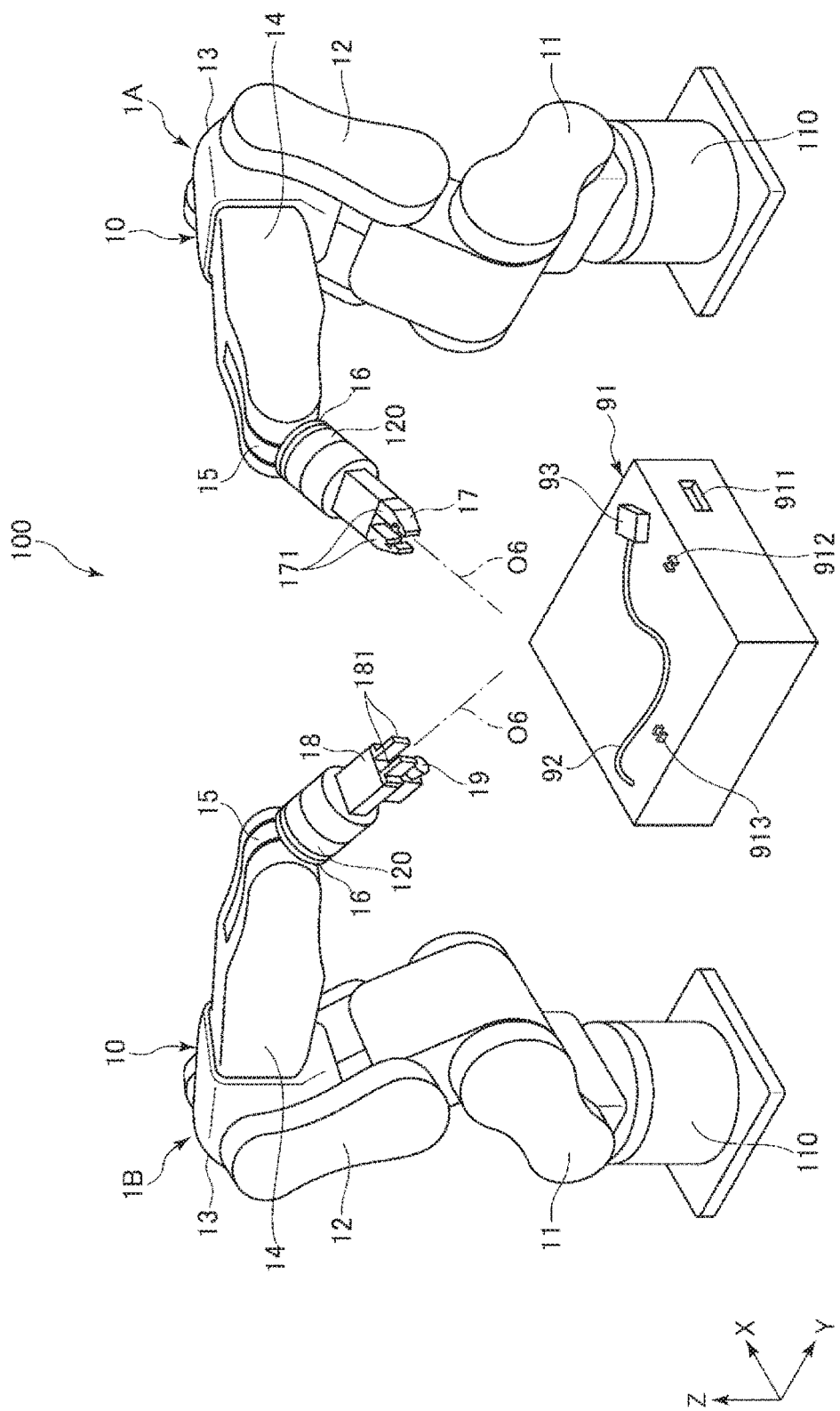
FIG. 1 is a diagram showing a robot system according to a first embodiment.
Figure 2:
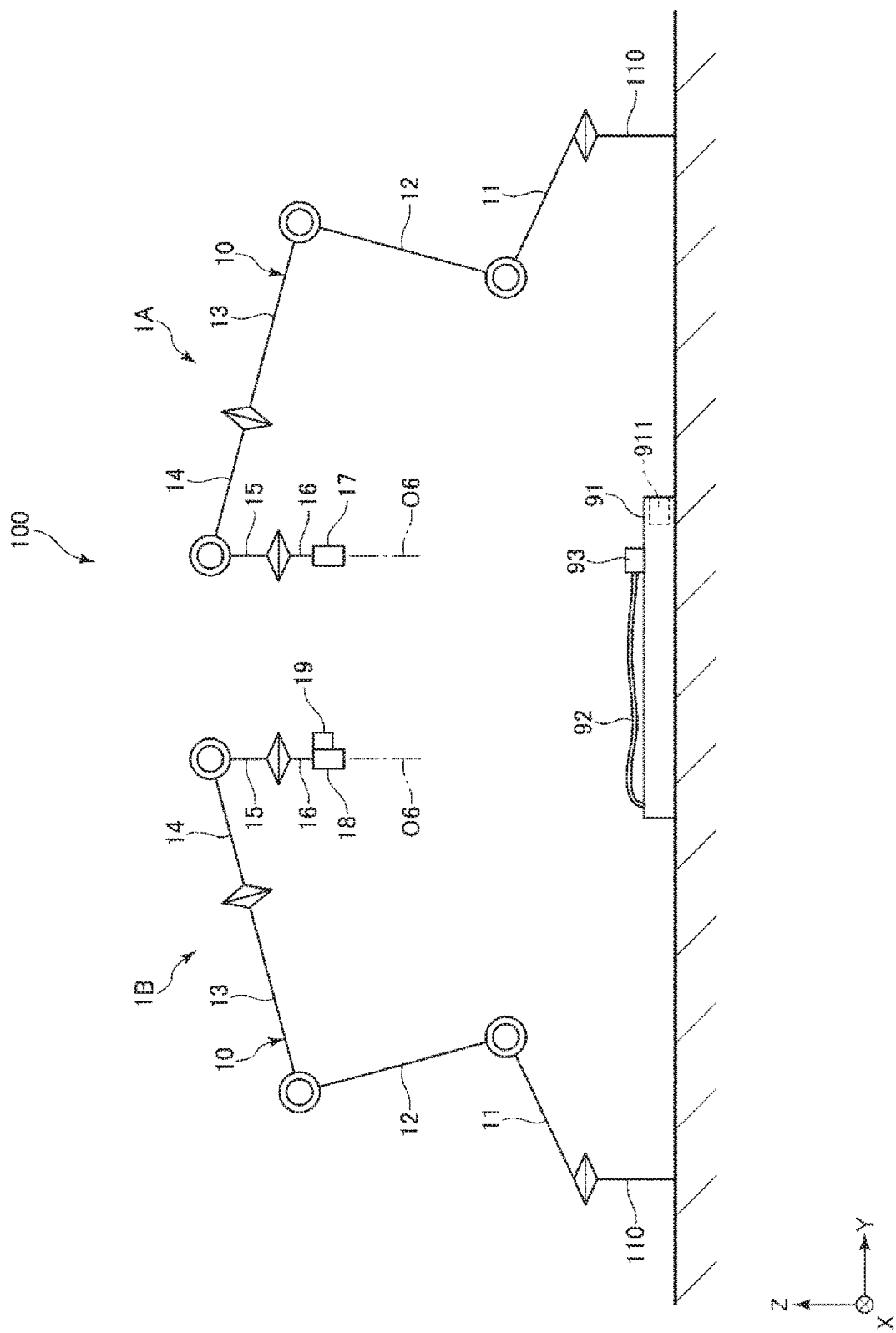
FIG. 2 is a schematic diagram of a robot shown in FIG. 1.

In FIG. 1, three axes (an X axis, a Y axis, and a Z axis) orthogonal to one another are shown. In the following explanation, a direction parallel to the X axis is referred to as "X-axis direction" as well, a direction parallel to the Y axis is referred to as "Y-axis direction" as well, and a direction parallel to the Z axis is referred to as "Z-axis direction" as well. In the following explanation, a distal end side of arrows shown in the figures is referred to as "+ (plus)" and a proximal end side of the arrows is referred to as "− (minus)". The Z-axis direction coincides with the "vertical direction" and a direction parallel to an X-Y plane coincides with the "horizontal direction". A + (plus) side of the Z axis is represented as "upper" and a − (minus) side of the Z axis is represented as "lower". In FIG. 2, illustration of a force detecting section 120 is omitted.

First Embodiment

Robot System

A robot system 100 shown in FIGS. 1 and 2 is used to, for example, perform work for inserting a connector 93 into an insertion hole 911 formed in a substrate 91. The robot system 100 includes a robot 1A, which is a first robot, a robot 1B, which is a second robot, and a control device 5 that controls driving of the robot 1A and the robot 1B.

Figure 3:
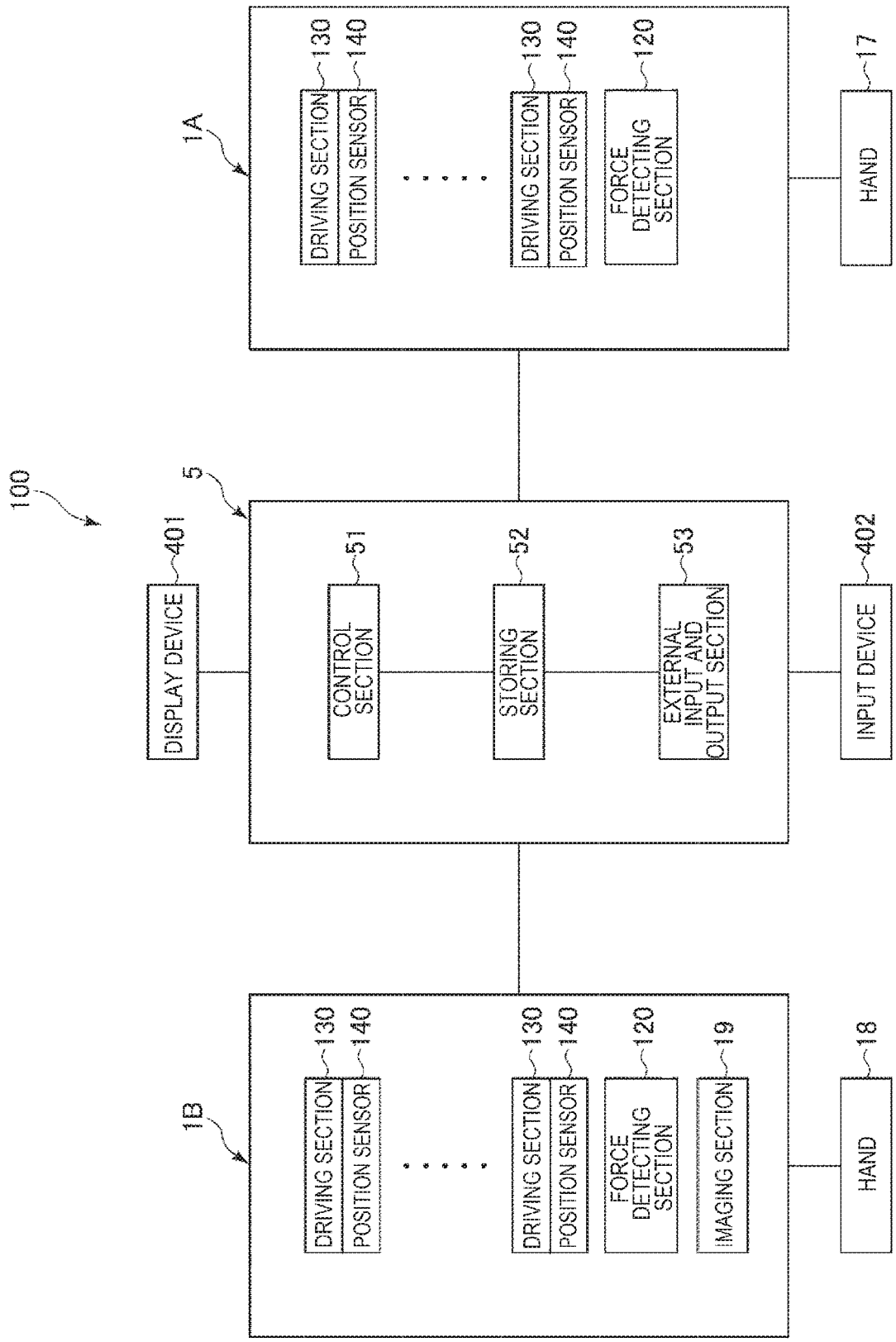
FIG. 3 is a block diagram showing the robot system.
Figure 4:
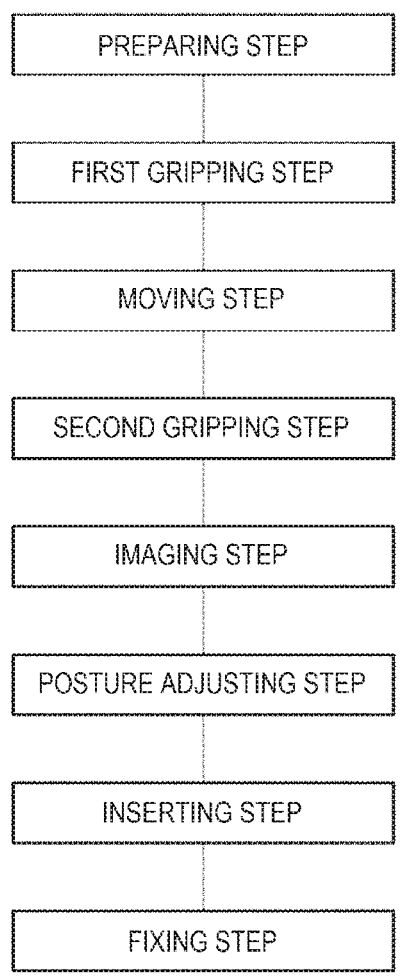
FIG. 4 is a flowchart showing a control method for the robot by a control device.

In the robot system 100, besides, as shown in FIG. 3, a display device 401 including a monitor and an input device 402 functioning as an operation device configured by a mouse, a keyboard, and the like are respectively communicably coupled.

As shown in FIG. 1, the substrate 91 is formed in a rectangular shape and is placed on a not-shown workbench. A cable 92 having flexibility is provided on the upper surface, that is, a surface on a +Z-axis side of the substrate 91. The connector 93 is attached to one end portion of the cable 92. The other end portion of the cable 92 is a fixed end fixed to the substrate 91. This fixed portion deviates to a corner side on a −X-axis side and a −Y-axis side. On the other hand, the one end portion, that is the end portion on the connector 93 side of the cable 92 is a free end. The cable 92 is, for example, a long FPC (Flexible Printed Circuit) or FFC (Flexible Flat Cable) having flexibility.

The connector 93 is a polyhedron. As an example, in FIG. 1, the connector 93 is a hexahedron. The connector 93 is inserted into, by the robot 1A, the insertion hole 911 provided on the side surface on a +Y-axis side of the substrate 91. In that inserted state, the cable 92 and a not-shown circuit of the substrate 91 are electrically coupled via a not-shown terminal in the insertion hole 911. A position where the insertion hole 911 is formed is not limited to the above and may be, for example, the side surface of the +Z-axis side of the substrate 91.

Robot 1A and Robot 1B

First, the robot 1A and the robot 1B are explained. The robot 1A and the robot 1B have substantially the same configuration except that setting positions and the configurations of distal end portions are different. Therefore, in the following explanation, common features of the robot 1A and the robot 1B are representatively explained using the robot 1A. Thereafter, differences between the robot 1A and the robot 1B are explained.

As shown in FIGS. 1 and 2, the robot 1A and the robot 1B are so-called six-axis vertical articulated robots and include bases 110 and robot arms 10 coupled to the bases 110. The robot 1A and the robot 1B are respectively single-arm type articulated robots. However, the robot 1A and the robot 1B are not limited to this. For example, one or both of the robot 1A and the robot 1B may be a SCARA robot. The robot 1A and the robot 1B may be a so-called double-arm type articulated robot obtained by integrating the robot 1A and the robot 1B.

The base 110 is a portion for attaching the robot 1A to any setting place. In this embodiment, the base 110 is set on, for example, a floor. The setting place of the base 110 is not limited to the floor or the like and may be, for example, a wall, a ceiling, or a movable truck.

As shown in FIGS. 1 and 2, the robot arm 10 includes an arm 11, an arm 12, an arm 13, an arm 14, an arm 15, and an arm 16. The arms 11 to 16 are coupled in this order from the proximal end side toward the distal end side. The arms 11 to 16 are turnable with respect to arms adjacent thereto or the base 110. As shown in FIG. 1, the arm 16 is formed in a disk shape and is turnable around an axis O6 with respect to the arm 15. As shown in FIG. 2, in this embodiment, the center of the distal end face of the arm 16 is referred to as predetermined point.

The robot arm 10 of the robot 1A configures a first arm and the robot arm 10 of the robot 1B configures a second arm.

As shown in FIG. 1, a hand 17, which is a gripping section or a first gripping section that grips the cable 92 or the connector 93, can be attached to the robot arm 10. For example, the robot arm 10 includes a component having a female screw or a male screw used to attach the hand 17 by screwing, bolting, or the like or a not-shown attaching section including an engaging section such as a hook or an L-shaped groove. Consequently, it is possible to easily attach the hand 17 to an appropriate position. The configuration of the hand 17 is explained in detail below.

As shown in FIG. 1, a force detecting section 120 is provided between the arm 16 and the hand 17 to be attachable to and detachable from the arm 16 and the hand 17. The force detecting section 120 detects a force applied to the hand 17. The force includes a moment. The force detecting section 120 is configured by, for example, a six-axis force sensor or a three-axis force sensor. The force detecting section 120 outputs detection information of a detected force to the control device 5. As explained below, the force detecting section 120 functions as a detecting section that detects contact of the hand 17 and the connector 93. Since the force detecting section 120 functioning as the detecting section is the force sensor, as explained above, it is possible to quickly and accurately detect that the hand 17 performs second gripping. Accordingly, it is possible to prevent or suppress excessive tension from being applied to the cable 92. The detecting section is not limited to the force detecting section 120 and may be, for example, a component that detects contact of the connector 93 and the hand 17 using a pressure sensor or a proximity sensor.

As shown in FIG. 3, the robot 1A includes a driving section 130 including a motor, which turns one arm with respect to the other arm or the base 110, and a speed reducer. As the motor, a servomotor such as an AC servomotor or a DC servomotor can be used. As the speed reducer, for example, a speed reducer of a planetary gear type or a wave motion gear device can be used. The robot 1A includes a position sensor 140, which is an angle sensor that detects a rotation angle of a rotating shaft of the motor or the speed reducer. As the position sensor 140, for example, a rotary encoder can be used. The driving section 130 and the position sensor 140 are provided in, for example, each of the arms 11 to 16. In this embodiment, the robot 1A includes six driving sections 130 and six position sensors 140. The driving sections 130 are electrically coupled to the control device 5 via, for example, a not-shown motor driver incorporated in the robot 1A. The position sensors 140 are also electrically coupled to the control device 5.

Hand 17

As shown in FIG. 1, the hand 17 is attached to the distal end portion of the robot arm 10 of the robot 1A. The hand 17 has a function of gripping the cable 92, at one end of which the connector 93 is provided. The hand 17 can rotate around the axis O6 according to rotation of the arm 16.

Figure 6:
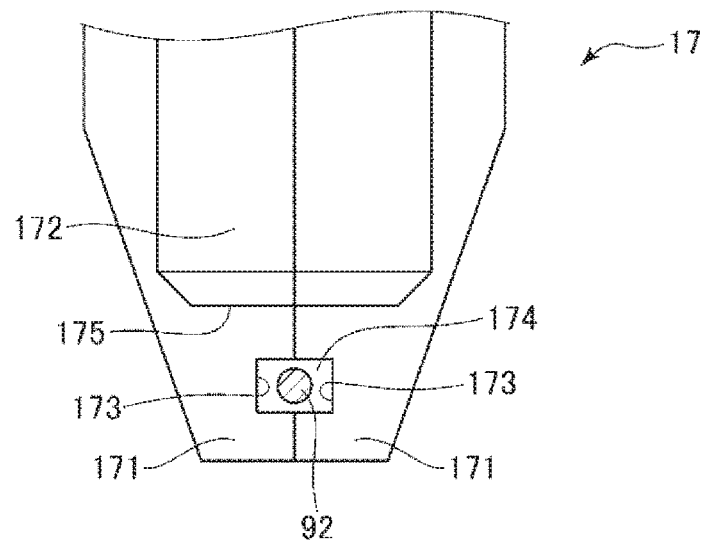
FIG. 6 is a plan view showing a hand (a first gripping section) attached to the robot (a first robot) shown in FIG. 1.
Figure 7:
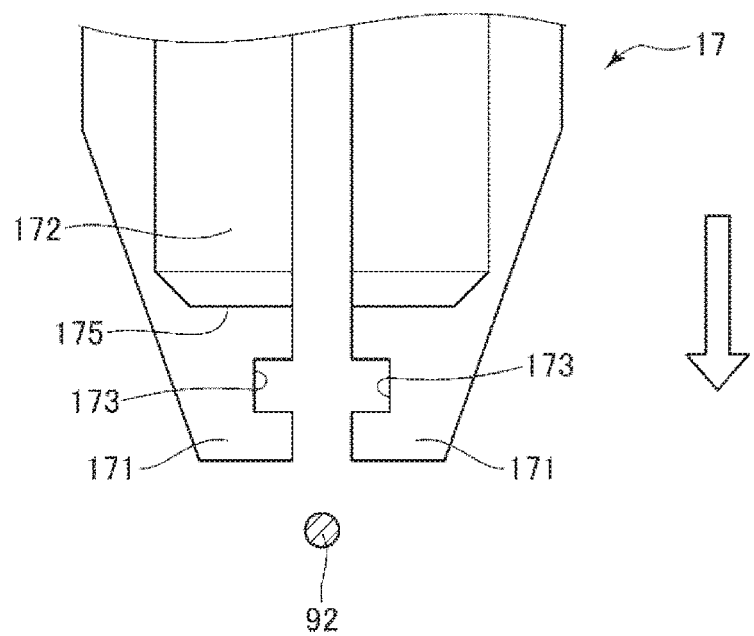
FIG. 7 is a plan view showing the hand (the first gripping section) attached to the robot (the first robot) shown in FIG. 1.

As shown in FIGS. 6 and 7, the hand 17 includes a pair of clamping pieces 171 configured to come into contact with and separate from each other and posture adjusting sections 172 that adjust the posture of the connector 93 when coming into contact with the connector 93. The clamping pieces 171 are coupled to a not-shown driving section. The driving section is electrically coupled to the control device 5. The operation of the driving section is controlled by the control device 5.

The clamping pieces 171 are claw sections. Cutouts 173 are respectively formed in opposed portions of the clamping pieces 171. As shown in FIG. 6, in a state in which the clamping pieces 171 are in contact, the cutouts 173 combine to form a defined space 174 defined by the clamping pieces 171. On the other hand, as shown in FIG. 7, in a state in which the clamping pieces 171 are separated, the defined space 174 shown in FIG. 6 opens. In this opened state, that is, the state in which the clamping pieces 171 are separated, the cable 92 can relatively move between the clamping pieces 171 along the longitudinal direction of the clamping pieces 171.

When the cable 92 comes to the position of the cutouts 173, as shown in FIG. 6, the clamping pieces 171 are brought close to and into contact with each other, whereby the cable 92 is housed in the defined space 174. In this state, the cable 92 is in a state in which the cable 92 is inserted through the defined space 174 and restricted from moving to the outer side of the defined space 174, that is, a state in which the cable 92 is restricted from moving in the radial direction of the cable 92.

Figure 8:
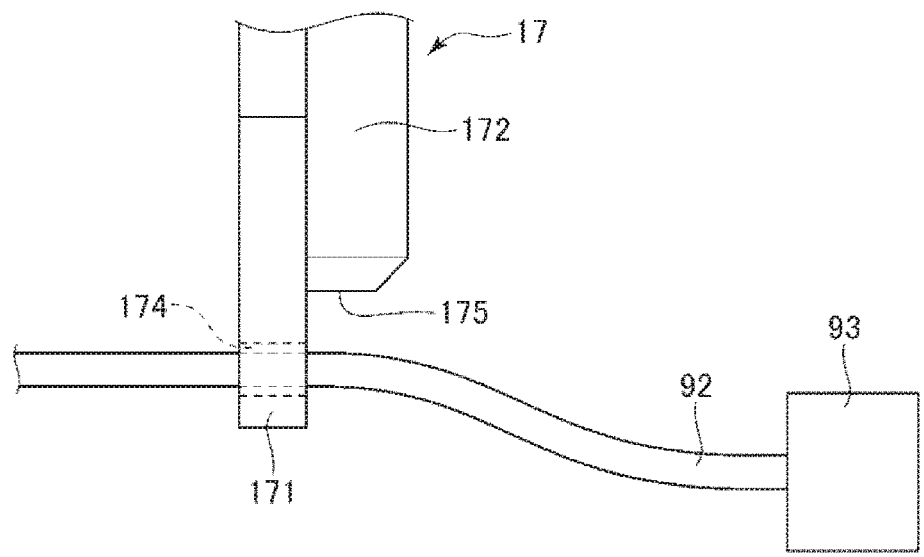
FIG. 8 is a side view showing the hand (the first gripping section) attached to the robot (the first robot) shown in FIG. 1.

The cable 92 can move in the radial direction in the defined space 174. However, since the movement to the outer side of the defined space 174 is restricted, in this specification, the cable 92 being located in the defined space 174 is referred to as a state in which the movement in the radial direction of the cable 92 is restricted. That is, this state can be considered a state in which the cable 92 is gripped by the clamping pieces 171. This gripping is hereinafter referred to as "first gripping". In other words, the state shown in FIGS. 6 and 8 is a state in which the hand 17 is performing the first gripping on the cable 92. In the state in which the first gripping is performed, the cable 92 is movable in the longitudinal direction of the cable 92 with respect to the hand 17.

As explained above, the hand 17, which is the gripping section, includes the two clamping pieces 171, which are a first claw section and a second claw section that come into contact with and separate from each other. In the state in which the clamping pieces 171 are in contact, the clamping pieces 171 form the defined space 174, which is a hole section through which the cable 92 is inserted. Consequently, it is possible to perform the first gripping. It is possible to perform operation for moving the hand 17 along the cable 92 as explained below. In the state in which the first gripping is performed, a clamping force is prevented or suppressed from being applied to the cable 92 more than necessary. It is possible to prevent or suppress damage to the cable 92.

As shown in FIG. 6, the cross-sectional area of the defined space 174, which is the hole section, is larger than the cross-sectional area of the cable 92 and is smaller than the cross-sectional area of the connector 93 or the area of the end face on the cable 92 side of the connector 93. When viewed from a direction orthogonal to the thickness direction of the cable 92, at least one of the two clamping pieces 171, which are the first claw section and the second claw section, and the connector 93 overlap. Consequently, even if the operation for moving the hand 17 along the cable 92 while performing the first gripping is quickly performed as explained below, it is possible to more effectively prevent or suppress damage to the cable 92.

Figure 9:
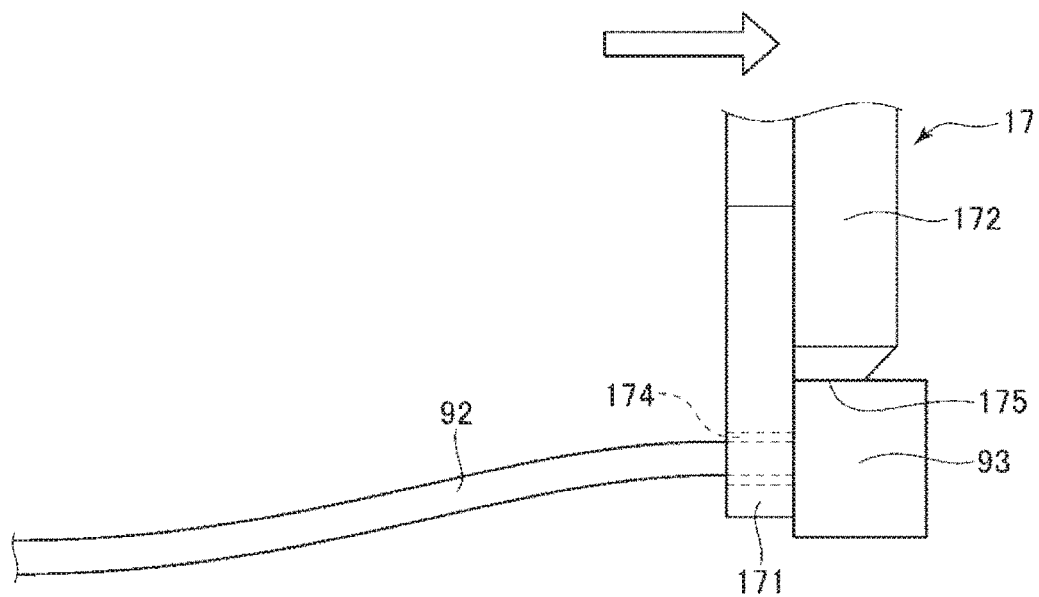
FIG. 9 is a side view showing the hand (the first gripping section) attached to the robot (the first robot) shown in FIG. 1.

As shown in FIGS. 8 and 9, the posture adjusting sections 172 are formed in block shapes respectively formed to project from one sides of the clamping pieces 171. The posture adjusting sections 172 are located above the defined space 174, that is, on the robot arm 10 side. As shown in FIG. 6, in the state in which the clamping pieces 171 are in contact, the block bodies are also in contact to form one block shape. In this state, end faces on the lower sides in FIGS. 6 to 9 of the posture adjusting sections 172, that is, end faces on the opposite side of the robot arm 10 form one plane. As shown in FIG. 9, this plane functions as a restricting surface 175 that comes into contact with the connector 93 to thereby restrict movement or rotation of the connector 93.

The clamping pieces 171 and the posture adjusting sections 172 may be integrally formed or may be separately formed. When the clamping pieces 171 and the posture adjusting sections 172 are separately formed, the posture adjusting sections 172 can be configured by one block body or plate material.

The hand 17 moves to the connector 93 side along the longitudinal direction of the cable 92 in the state in which the first gripping is performed as shown in FIG. 8, whereby, as shown in FIG. 9, the connector 93 comes in to contact with the clamping pieces 171 and the posture adjusting sections 172. In this contact state, the connector 93 is restricted from moving in a direction along the longitudinal direction of the cable 92 and rotating around an axis along the longitudinal direction of the cable 92 or around the center axis of the defined space 174 by the surfaces on the posture adjusting section 172 side of the clamping pieces 171 and the restricting surface 175 of the posture adjusting sections 172. Consequently, in this state, the connector 93 is gripped by the hand 17. This gripping is hereinafter referred to as "second gripping". In other words, the state shown in FIG. 9 is a state in which the hand 17 is performing the second gripping on the connector 93.

A tool point is set at the tip of the hand 17, that is, the tips of the clamping pieces 171. A tip coordinate system having the tool point as an origin is set in the robot 1A.

Hand 18

As shown in FIG. 1, a hand 18 is attached to the distal end portion of the robot arm 10 of the robot 1B. The hand 18 can rotate around the axis O6 according to rotation of the arm 16. The hand 18 is a second gripping section having a function of gripping the connector 93, on which the second gripping is performed by the hand 17, and rotating the connector 93 to adjust the posture of the connector 93. In this embodiment, as shown in FIGS. 10 and 11, the hand 18 includes a pair of clamping pieces 181 configured to come into contact with and separate from each other.

The clamping pieces 181 are coupled to a not-shown driving section. The driving section is electrically coupled to the control device 5. The operation of the driving section is controlled by the control device 5. The clamping pieces 181 move in a direction in which the clamping pieces 181 come into contact with each other, whereby the connector 93 can be gripped between the clamping pieces 181. The clamping pieces 181 separate from each other, whereby the gripping of the connector 93 can be released.

Figure 10:
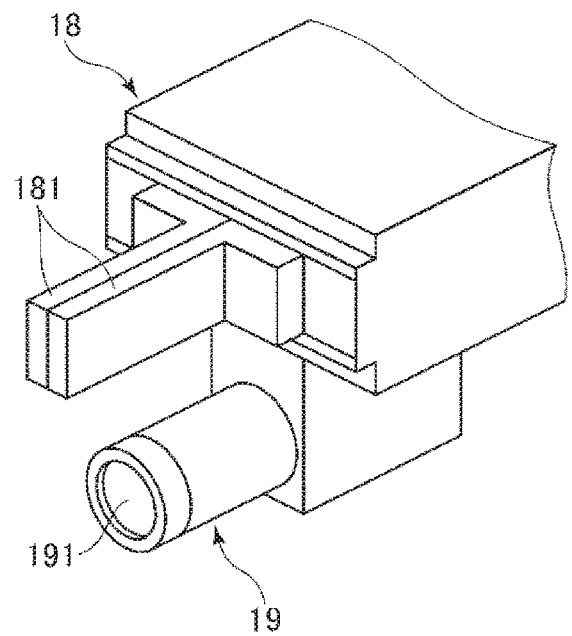
FIG. 10 is a perspective view showing a hand (a second gripping section) attached to a robot (a second robot) shown in FIG. 1.
Figure 11:
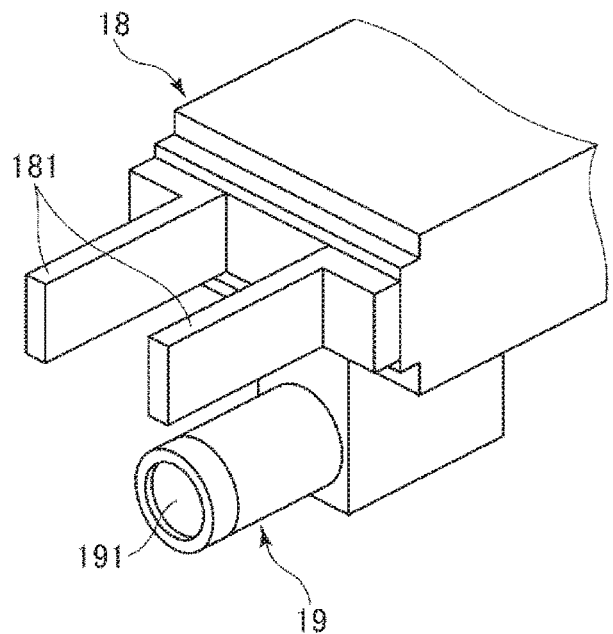
FIG. 11 is a perspective view showing the hand (the second gripping section) attached to the robot (the second robot) shown in FIG. 1.

In the configuration shown in FIGS. 10 and 11, the hand 18 is configured to grip the connector 93 with the pair of clamping pieces 181. However, the hand 18 is not limited to this and may be configured to grip the connector 93 with three or more clamping pieces or may be configured to grip the connector 93 with attraction.

A tool point is set at the tip of the hand 18, that is, the tips of the clamping pieces 181. A tip coordinate system having the tool point as an origin is set in the robot 1B.

Imaging Section 19

As shown in FIGS. 1, 10, and 11, an imaging section 19 is provided at the distal end portion of the robot arm 10 of the robot 1B. As the imaging section 19, for example, a CCD (Charge Coupled Device) camera can be used. The imaging section 19 is retracted further than the clamping pieces 181 of the hand 18, that is, located on the robot arm 10 side. Consequently, when the clamping pieces 181 grip the connector 93, it is easy to prevent the imaging section 19 from interfering with the connector 93.

The imaging section 19 includes a light source 191 at the distal end portion thereof, that is, in the outer circumferential portion of a lens. Consequently, even if a space where the robot 1A and the robot 1B perform work is relatively dark or the connector 93 is shaded by the robot 1A depending on the position of illumination set in the space, it is possible to satisfactorily and clearly perform imaging of the connector 93.

The imaging section 19 is electrically coupled to the control device 5. An imaging result of the imaging section 19, that is, an image is transmitted to the control device 5. The image includes a still image and a moving image. The imaging section 19 is not limited to the CCD camera and may be a spectroscopic camera. In this case, spectral data, that is, spectral spectrum is transmitted to the control device 5.

An image coordinate system is set in the image output by the imaging section 19. The tip coordinate system of the hand 17, the tip coordinate system of the hand 18, and the image coordinate system are associated with one another, that is, calibration of the tip coordinate system of the hand 17, the tip coordinate system of the hand 18, and the image coordinate system is finished.

Control Device

As shown in FIG. 3, the control device 5 has a function of controlling driving of the robot 1A, the robot 1B, and the like. The control device 5 is communicably coupled to the robot 1A and the robot 1B. These may be coupled to one another by wire or by radio. In the configuration shown in FIG. 3, the control device 5 is disposed in a position different from the robot 1A and the robot 1B. However, the control device 5 may be incorporated in one of the robot 1A and the robot 1B or may be incorporated in both of the robot 1A and the robot 1B.

The display device 401 including a not-shown monitor and the input device 402 including, for example, a keyboard, a mouse, and a teaching pendant are coupled to the control device 5.

As shown in FIG. 3, the control device 5 includes a control section 51 including a processor, a storing section 52 including a memory, and an external input and output section 53 including an external interface (I/F). The components of the control device 5 are communicably coupled to one another via various buses.

The control section 51 includes a processor such as a CPU (Central Processing Unit) and executes various programs and the like stored in the storing section 52. Consequently, it is possible to realize processing such as control of driving of the robot 1A and the robot 1B, various arithmetic operations, and determination.

Various programs executable by the control section 51, for example, a program for executing a control method explained below and reference data, a threshold, a calibration curve, and the like used during a control operation are stored in the storing section 52. Various data received by the external input and output section 53 can be stored in the storing section 52. The storing section 52 includes, for example, a volatile memory such as a RAM (Random Access Memory) and a nonvolatile memory such as a ROM (Read Only Memory). The storing section 52 is not limited to a non-detachable type and may include a detachable external storage device (not shown in FIG. 3). The storing section 52 may be set in another place via a network such as a LAN (Local Area Network).

The external input and output section 53 includes an external interface (I/F) and is used for coupling of the robot 1A, the robot 1B, the display device 401, the input device 402, and the like. The external input and output section 53 functions as a receiving section that receives information concerning an image output from the imaging section 19.

Other components may be further added to the control device 5 in addition to the components explained above. The various programs, the data, and the like stored in the storing section 52 may be stored in the storing section 52 in advance, may be stored in a recording medium such as a CD-ROM and provided from the recording medium, or may be provided via a network or the like.

The control device 5 can perform position control and force control as a control operation for driving the robot arm 10.

The position control means, for example, control for driving the robot 1A or the robot 1B such that the tool point is located in a predetermined coordinate. That is, the position control means control for driving the robot 1A or the robot 1B based on position information of a target and position information of the tool point. Such position control is control performed on the premise that an obstacle is absent in a route to a target position. The position control can move the robot arm 10 at speed higher than speed of the force control and contributes to quick work. Speed of the robot 1A or the robot 1B in the position control may be constant or may not be constant.

The force control means control for driving the robot 1A or the robot 1B based on a detection result of the force detecting section 120. The force control includes, for example, impedance control and force trigger control.

In the force trigger control, force detection is performed by the force detecting section 120. The robot 1A and the robot 1B are caused to perform operations such as movement and a change of a posture until the force detecting section 120 detects a predetermined force.

The impedance control includes following control. First, explaining briefly, in the impedance control, the operation of the robot 1A or the robot 1B is controlled to maintain a force applied to the distal end portion of the robot arm 10 and the hand 17 or the hand 18 at a predetermined force as much as possible, that is, maintain a force in a predetermined direction detected by the force detecting section 120 at a target value as much as possible.

Control Method

A control operation performed by the control device 5 is explained mainly with reference to FIGS. 4, 5 and 12 to 27.

In the following explanation, moving the tool point of the hand 17 to a predetermined position is referred to as "move the hand 17 to a predetermined position" or "move the robot 1A to a predetermined position".

The control method is a control method performed using the robot 1A and the robot 1B. The control method includes [1] a preparing step, [2] a first gripping step, [3] a moving step, [4] a second gripping step, [5] an imaging step, [6] a posture adjusting step, [7] an inserting step, and [8] a fixing step.

[1] Preparing Step

The preparing step is a step of preparing the robot 1A attached with the hand 17 and the robot 1B attached with the hand 18 and the imaging section 19. "Preparing" means a step, such as the coordinate system calibration and the like explained above, performed until the robot system 100 is started up to an operable state when the robot system 100 performs coupling work.

Figure 12:
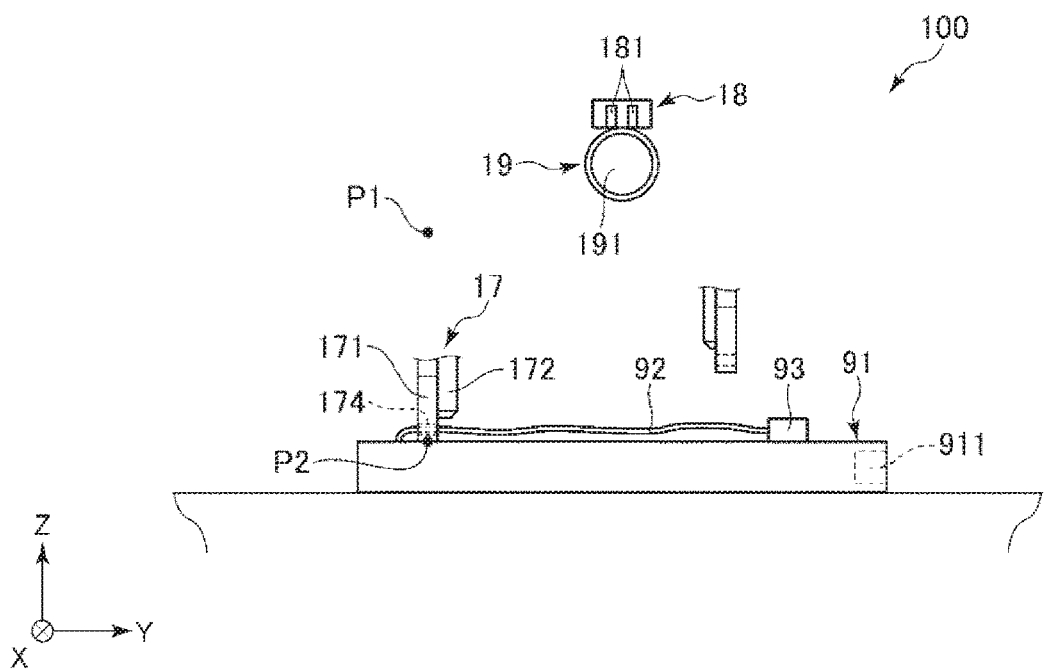
FIG. 12 is a side view for explaining an operation state of the robot system shown in FIG. 1.
Figure 13:
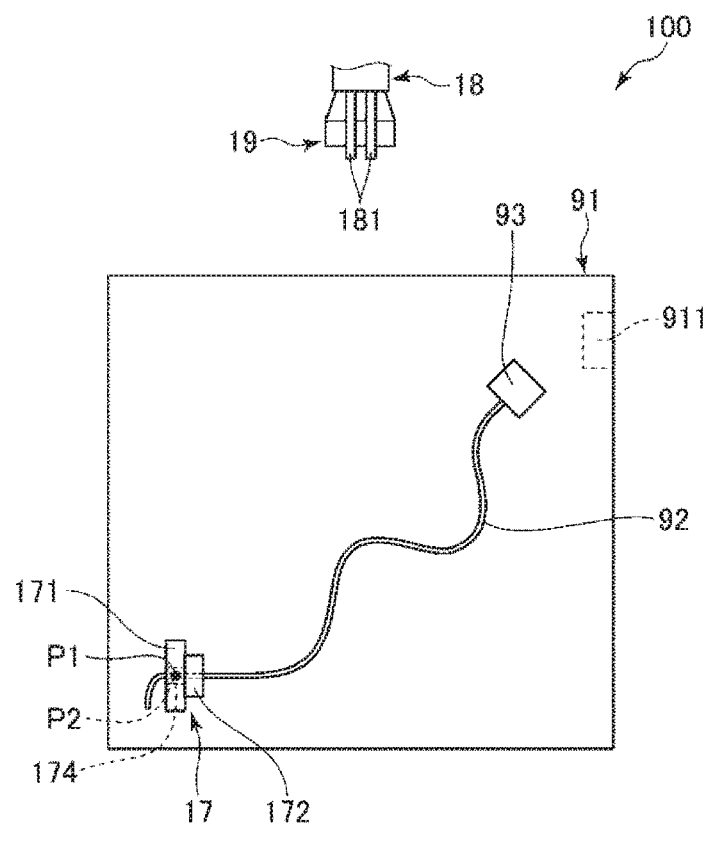
FIG. 13 is a plan view for explaining the operation state of the robot system shown in FIG. 1.

In the preparing step, as shown in FIGS. 12 and 13, it is desirable to drive the robot 1B to move the hand 18 and the imaging section 19 to the +X-axis side and the +Z-axis side of the substrate 91 and direct the hand 18 and the imaging section 19 to the −X-axis side. Consequently, it is possible to smoothly perform [5] the imaging step and [6] the posture adjusting step. This movement may be performed simultaneously with any one of [1] the preparing step to [4] the second gripping step.

[2] First Gripping Step

The first gripping step shown in FIGS. 12 and 13 is a step of causing the hand 17 to perform the first gripping for gripping the cable 92 to restrict the cable 92 from moving in the radial direction of the cable 92. Specifically, as shown in FIG. 13, the hand 17 is moved to a position P1 and lowered toward the cable 92, that is, a position P2 in the state in which the clamping pieces 171 are separated. Thereafter, the clamping pieces 171 are brought close to and into contact with each other, whereby the cable 92 is housed in the defined space 174 and the hand 17 performs the first gripping.

The position P1 and the position P2 are coordinates stored in the storing section 52 in advance. The coordinates may be input by an operator or may be coordinates specified based on an image captured by the imaging section 19 in advance. In this embodiment, the position P1 is any coordinate in the vicinity of the fixed end of the cable 92 and the position P2 is a coordinate on the −Z-axis side of the position P1.

In other words, a portion where the hand 17, which is the gripping section, performs the first gripping is a portion deviating to the fixed end side in the cable 92. Further, in other words, the distance from one end of the cable 92 to the portion where the hand 17 performs the first gripping is larger than the distance from the other end of the cable 92 to the portion where the hand 17 performs the first gripping.

The position of the fixed end is determined in advance. The vicinity of the fixed end in the cable 92 is located in a position generally decided irrespective of a position of the connector 93 on the substrate 91. Therefore, the movement of the hand 17 until performing the first gripping can be controlled using the position control. Accordingly, it is possible to quickly perform the first gripping and perform the first gripping at high accuracy.

[3] Moving Step

Figure 14:
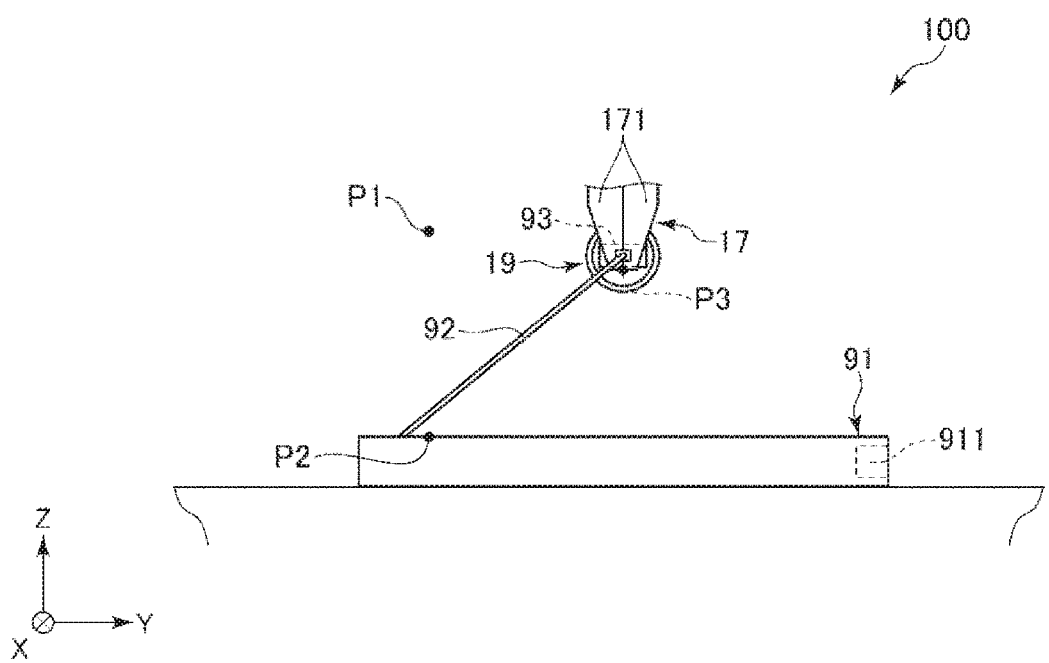
FIG. 14 is a side view for explaining the operation state of the robot system shown in FIG. 1.
Figure 15:
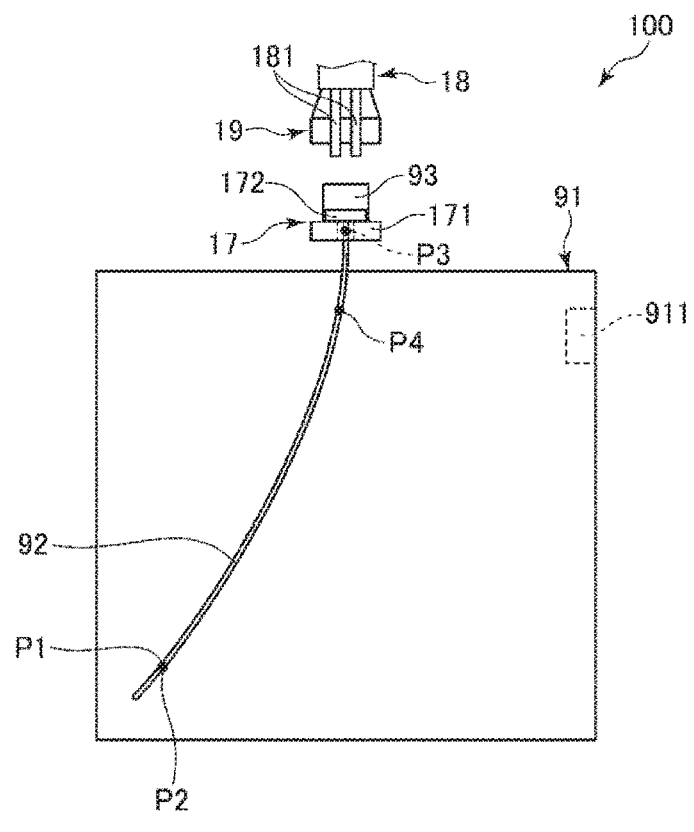
FIG. 15 is a plan view for explaining the operation state of the robot system shown in FIG. 1.

As shown in FIGS. 14 and 15, in the moving step, the hand 17 is moved toward the connector 93 side along the cable 92 in the state in which the first gripping is performed. In this step, in order to quickly perform the imaging step after this step, the hand 17 is moved toward a position P3 in the vicinity on the −X-axis side of the imaging section 19. A route of this movement may be a straight line or may be an arcuate shape.

In this embodiment, when the hand 17 is moved from the position P2 to the position P3, the hand 17 is moved by the position control up to a position P4 immediately before the position P3 and is moved by the force control from the position P4 to the position P3. That is, when moving the hand 17, which is the gripping section, toward the connector 93 in the state in which the first gripping is performed, the control device 5 includes a section in which the hand 17 is moved by the position control. Consequently, quick movement can be performed by the position control.

The position P4 is set on a moving route between the position P2 and the position P3. The position P3 and the position P4 are coordinates stored in the storing section 52 in advance. The position P4 desirably deviates to the position P3 side in the moving route between the position P2 and the position P3. Consequently, it is possible to more quickly move the hand 17 to the position P3. In the moving route of the hand 17, the distance from the position P4 to the position P3 is desirably smaller than 5% of the distance from the position P2 to the position P4. Consequently, it is possible to more markedly exert the effects explained above.

The position, that is, a bending state of the cable 92 changes according to the position on the substrate of the connector 93. However, as explained above, in the state in which the first gripping is performed, the cable 92 is restricted from moving to the outer side of the defined space 174. Consequently, in a portion of the cable 92 where the hand 17 has passed, the cable 92 extends generally along the moving route of the hand 17. When the hand 17 is moved from the position P2 to the position P4 by the position control, since the area of the defined space 174 is larger than the cross-sectional area of the cable 92 as shown in FIG. 6, it is possible to sufficiently reduce a contact opportunity of the cable 92 and the clamping pieces 171. It is possible to prevent or suppress damage to the cable 92.

When the hand 17 is moved to the position P4, the position control is switched to the force control. The force control is a mode for performing force detection by the force detecting section 120 while moving the hand 17 at moving speed lower than moving speed of the hand 17 in the position control. Therefore, when the hand 17 is moving to the position P3 and it is determined that the hand 17 and the connector 93 come into contact and the hand 17 grips the connector 93, the movement of the hand 17 can be immediately stopped. It is possible to prevent or suppress tension from being excessively applied to the cable 92.

In this embodiment, the moving step is performed immediately before the hand 17 and the connector 93 come into contact with each other.

[4] Second Gripping Step

The second gripping step is a step of stopping the movement of the hand 17 based on a detection result of the force detecting section 120 and performing the second gripping for causing the hand 17 to grip the connector 93 as shown in FIGS. 9, 14, and 15. When the hand 17, which is performing the first gripping, is moved toward the position P3 by the force control, the hand 17 and the connector 93 come into contact with each other. When a force received by the hand 17 when the hand 17 comes into contact with the connector 93, that is, a force detected by the force detecting section 120 reaches a predetermined value, the movement of the hand 17 is stopped.

At this time, as shown in FIG. 9, the connector 93 is restricted from moving in the direction along the longitudinal direction of the cable 92 and restricted from rotating around the axis along the longitudinal direction of the cable 92 or the center axis of the defined space 174 by the surfaces on the posture adjusting section 172 side of the clamping pieces 171 and the restricting surface 175 of the posture adjusting sections 172. Consequently, it is possible to perform the second gripping.

Since the hand 17 sequentially performs the first gripping and the second gripping in this way, the connector 93 can be stably gripped by a simple method. In the past, for example, the entire substrate is imaged by the imaging section, a position of the substrate where the connector is disposed is specified, the hand is moved to the position, and the connector is gripped by the hand. In such a method in the past, a satisfactory image cannot be captured depending on imaging conditions such as brightness of a room and an imaging direction. It is difficult to specify the position of the connector. Further, in the method in the past, it is necessary to perform processing for specifying the connector in an image. Therefore, the processing is complicated. That is, in the method in the past, it is difficult to easily and accurately grip the connector. On the other hand, in the present disclosure, it is possible to accurately grip the connector without the necessity of performing the complicated processing in the past with a simple method in which the hand 17 sequentially performs the first gripping and the second gripping. Consequently, according to the present disclosure, it is possible to easily and accurately grip the connector.

In a state in which the second gripping is performed, a surface of the connector 93 in contact with the posture adjusting sections 172 is random every time. That is, in the state in which the hand 17 is performing the second gripping, it is unknown whether a posture of the connector 93 in the circumferential direction of the cable 92 is proper.

[5] Imaging Step

The imaging step is a step of imaging, with the imaging section 19, the connector 93 on which the hand 17 is performing the second gripping, as shown in FIGS. 14 and 15. In the position P3, the connector 93 gripped by the hand 17 is located at the same height as the height of the imaging section 19, that is, the position in the Z-axis direction of the connector 93 is located in substantially the same position as the position of the imaging section 19. Consequently, when the connector 93 is imaged, the connector 93 is located in the center of an image. As explained above, when the imaging step is performed, since the hand 18 is located in advance in the position shown in FIGS. 14 and 15, the second gripping step can be quickly shifted to this step when the second gripping step is completed.

The image captured in this step is transmitted to the control device 5.

[6] Posture Adjusting Step

Figure 5:
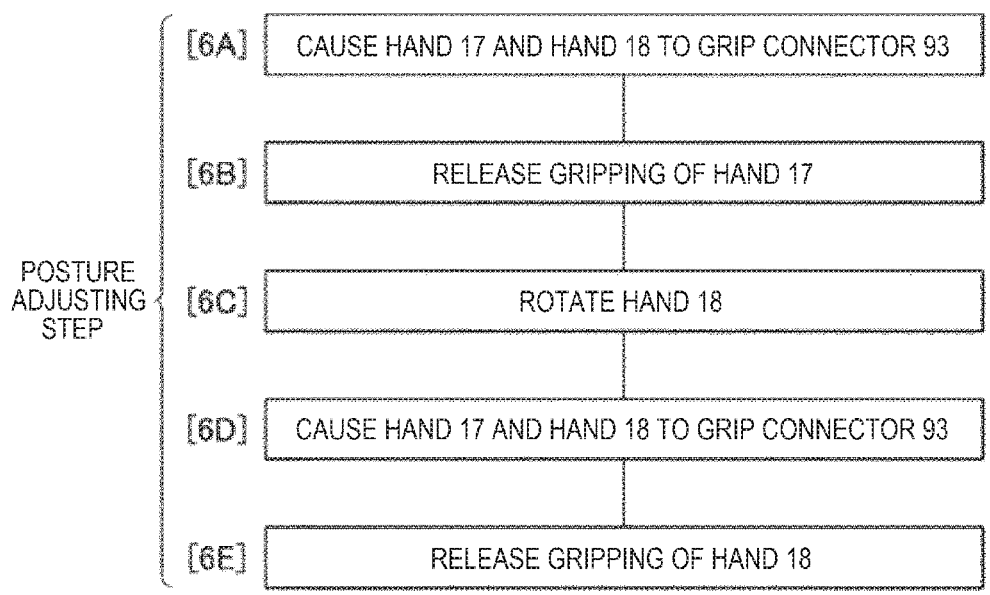
FIG. 5 is a detailed flowchart of a posture adjusting step shown in FIG. 4.

The posture adjusting step is a step of, when the posture of the connector 93, on which the second gripping is performed, is not a desired posture, causing the hand 17 to grip the connector 93 in the desired posture using the hand 18. The posture adjusting step includes the following steps [6A] to [6E] as shown in FIG. 5.

Figure 16:
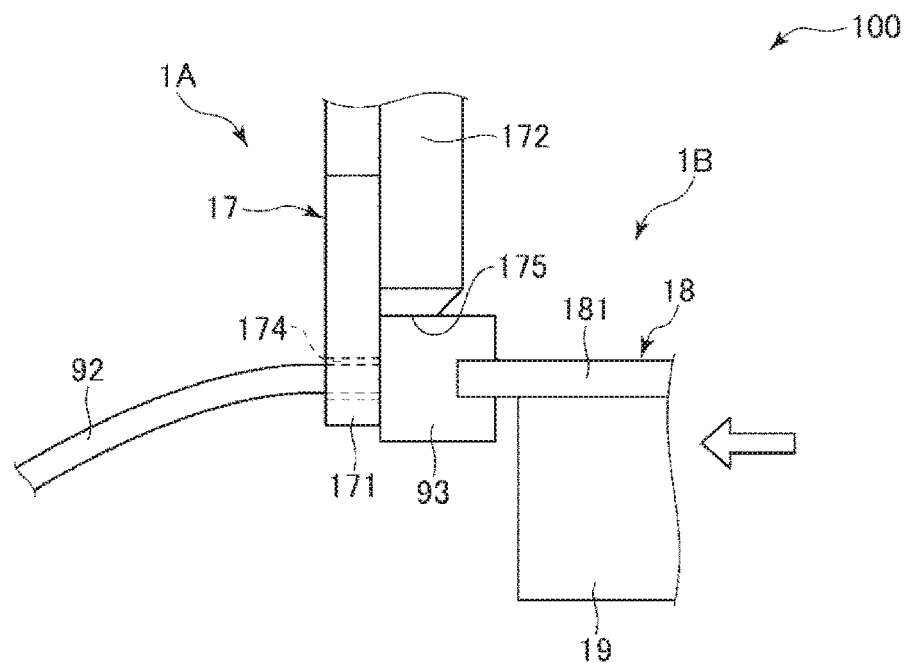
FIG. 16 is a state explanatory diagram showing the posture adjusting step.

The step [6A] is a step of causing the hand 18 to grip the connector 93, on which the second gripping is performed, as shown in FIG. 16. That is, in this step, the connector 93 is gripped by the hand 17 and the hand 18. Consequently, when the connector 93 is passed between the hand 17 and the hand 18, it is possible to prevent the connector 93 from unintentionally dropping.

Figure 17:
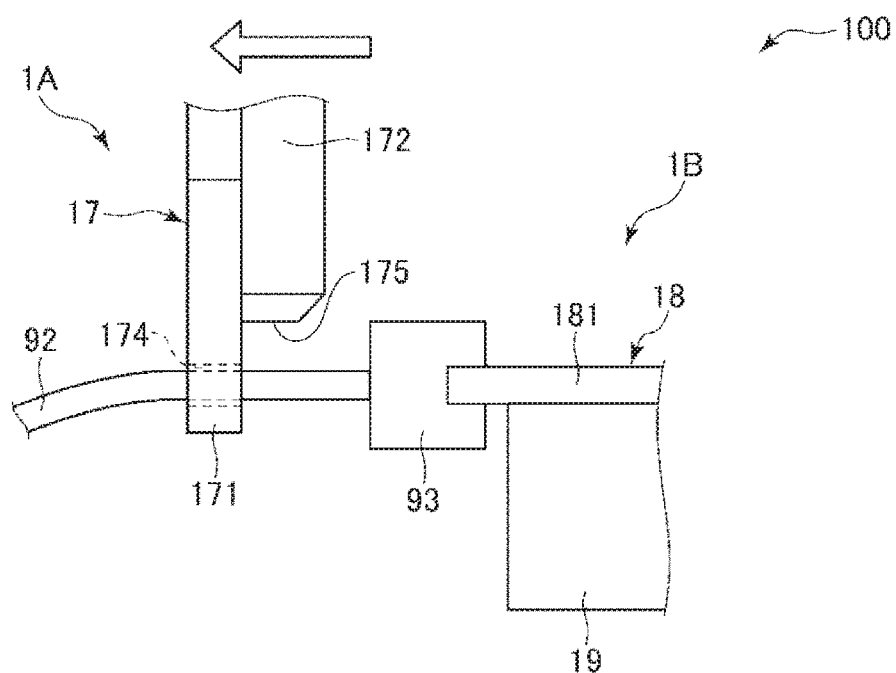
FIG. 17 is a state explanatory diagram showing the posture adjusting step.

In the step [6B], as shown in FIG. 17, the hand 17 is moved in a direction in which the hand 17 separates from the hand 18 and the second gripping performed by the hand 17 is released while the state in which the hand 18 grips the connector 93 is maintained. Consequently, only the hand 18 grips the connector 93 through this step.

Figure 18:
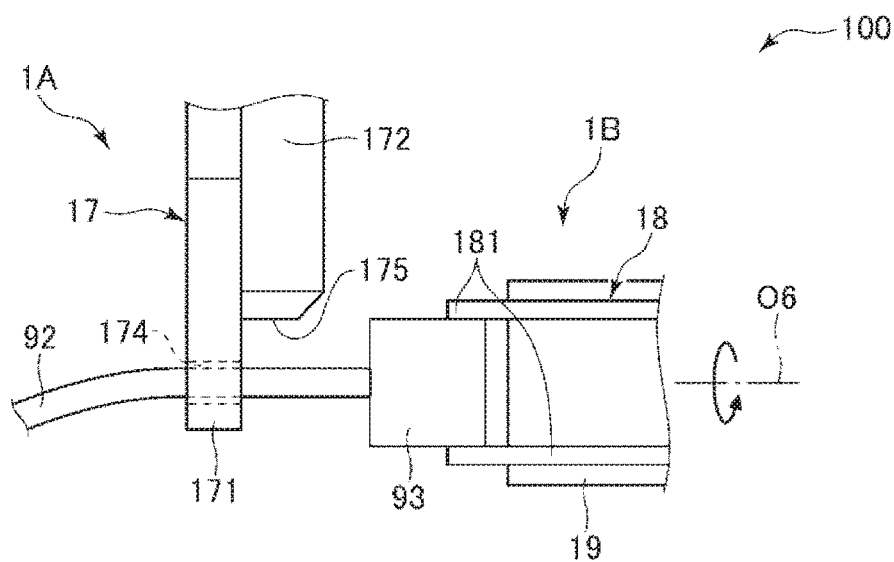
FIG. 18 is a state explanatory diagram showing the posture adjusting step.

The step [6C] is a step of rotating the hand 18 around the axis O6 to adjust the direction of the connector 93 to the desired posture as shown in FIG. 18. In this step, a rotation amount of the hand 18 is determined based on the imaging result that is, the image obtained in [5] the imaging step.

Specifically, for example, it is possible to use a method of extracting a plurality of feature points in a captured image, comparing arrangement of the feature points with arrangement of feature points in an image of the connector 93 in the desired posture stored in the storing section 52 in advance, and calculating a rotation amount. It is also possible to use other methods such as a method of comparing the center line of an end face of the connector 93 with a center line in the image stored in the storing section 52 in advance and calculating a rotation amount from a deviation amount.

The connector 93 can be set to the desired posture through such a step [6C]. The desired posture means a posture in which the connector 93 can be inserted into the insertion hole 911 in a desired direction when the hand 17 thereafter traces a preset route in a state in which the hand 17 grips the connector 93.

Figure 19:
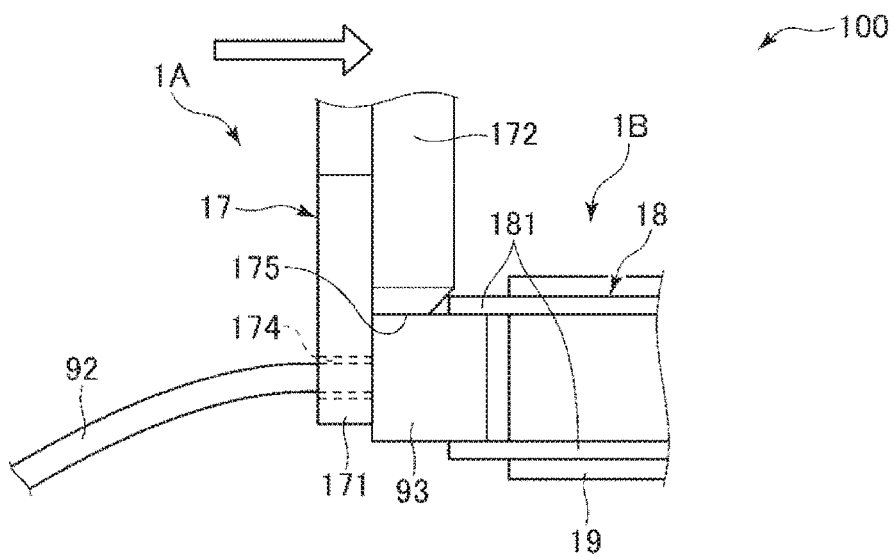
FIG. 19 is a state explanatory diagram showing the posture adjusting step.

The step [6D] is a step of causing the hand 17 to grip the connector 93 in the desired posture gripped by the hand 18 as shown in FIG. 19. That is, in this step, the connector 93 in the desired posture is gripped by the hand 17 and the hand 18. Consequently, when the connector 93 is passed between the hand 17 and the hand 18, it is possible to prevent the connector 93 from unintentionally dropping.

Figure 20:
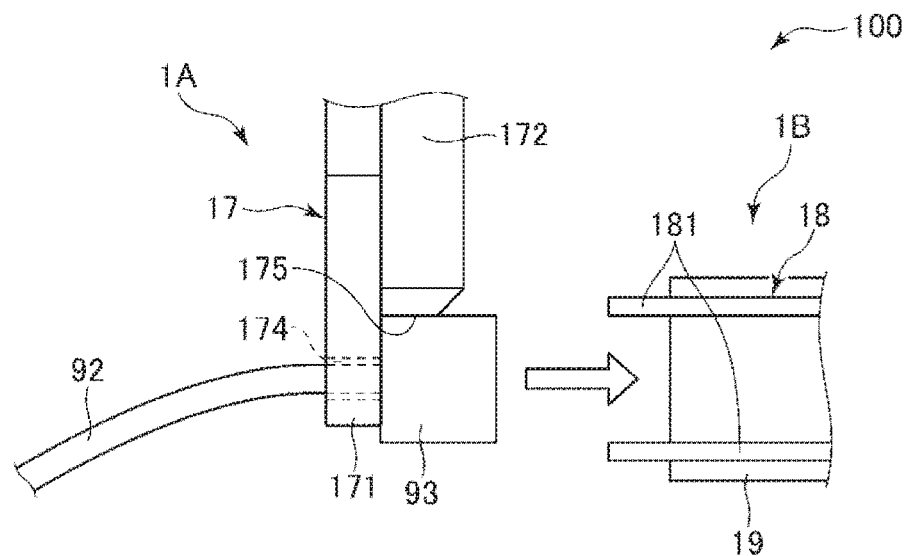
FIG. 20 is a state explanatory diagram showing the posture adjusting step.

In the step [6E], as shown in FIG. 20, the hand 18 is moved in a direction in which the hand 18 separates from the hand 17 and the gripping performed by the hand 18 is released while the state in which the hand 17 grips the connector 93 is maintained. Consequently, only the hand 17 grips the connector 93, that is, only the hand 17 is performing the second gripping through this step.

By performing the steps [6A] to [6E] explained above, it is possible to adjust the posture of the connector 93 to the desired posture from the state in which the hand 17 is performing the second gripping and bring the hand 17 again into the state in which the hand 17 is performing the second gripping. Accordingly, in the following inserting step, it is possible to insert the connector 93 into the insertion hole 911 with simple control. It is possible to perform adjustment of a posture without excessively applying tension to the cable 92 with a simple method of changing the hold of and rotating the connector 93.

When the connector 93 is in the desired posture in the captured image, it is possible to omit the steps [6A] to [6E] and shift to the inserting step.

Figure 21:
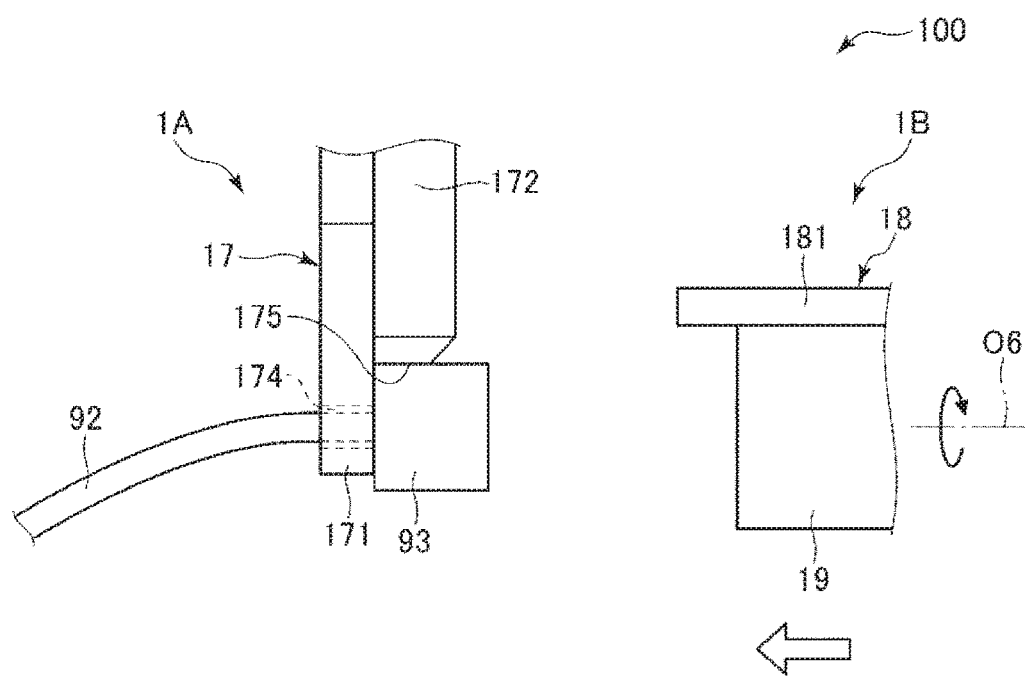
FIG. 21 is a state explanatory diagram showing the posture adjusting step.
Figure 22:
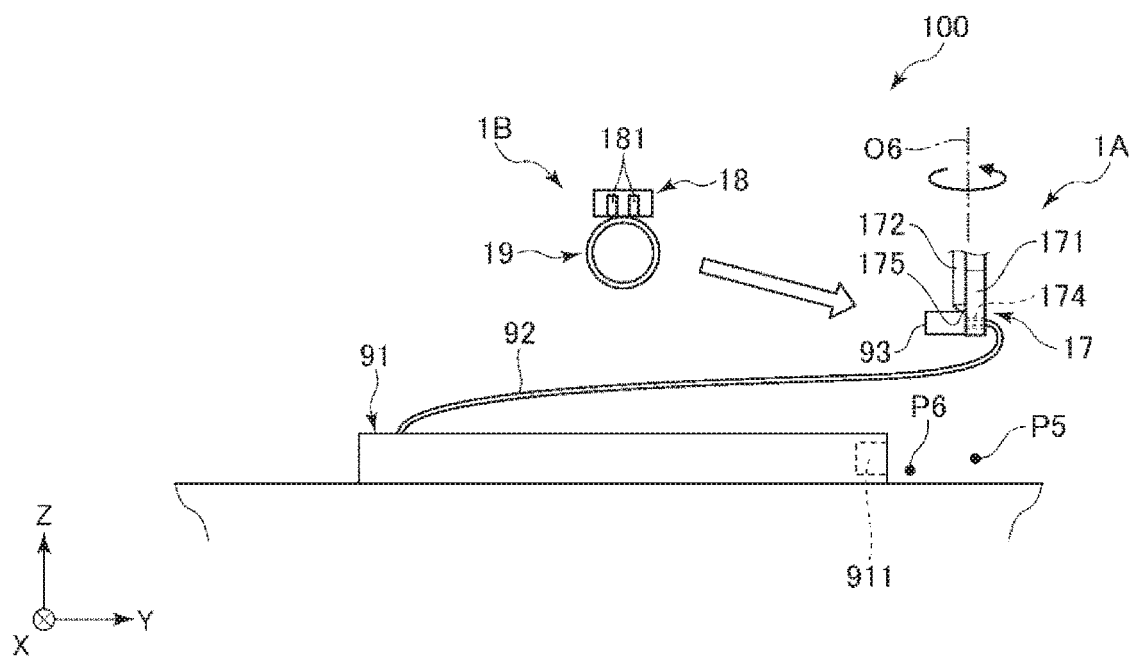
FIG. 22 is a side view for explaining an operation state of the robot system shown in FIG. 1.

After the step [6E] is completed, as shown in FIG. 21, the hand 18 is rotated around the axis O6 and returned to the posture shown in FIGS. 12 to 15 and moved to the initial position. Consequently, it is possible to smoothly perform the next imaging step.

[7] Inserting Step

The inserting step is a step of inserting the connector 93 into the insertion hole 911 of the substrate 91 as shown in FIGS. 22 to 25. Specifically, first, the tip of the hand 17, which is performing the second gripping on the connector 93 in the desired posture, is moved to a preset position P5 in an arrow direction in FIG. 22.

The position P5 is a coordinate on the +Y-axis side of the substrate 91 and in the same position in the X-axis direction as the center of the insertion hole 911. The hand 17 is rotated around the axis O6 such that the end face of the connector 93 on the opposite side of the cable 92 faces the insertion hole 911. Such movement and rotation may be simultaneously performed or may be sequentially performed. When the movement and the rotation are sequentially performed, the order of the movement and the rotation is not limited.

Figure 23:
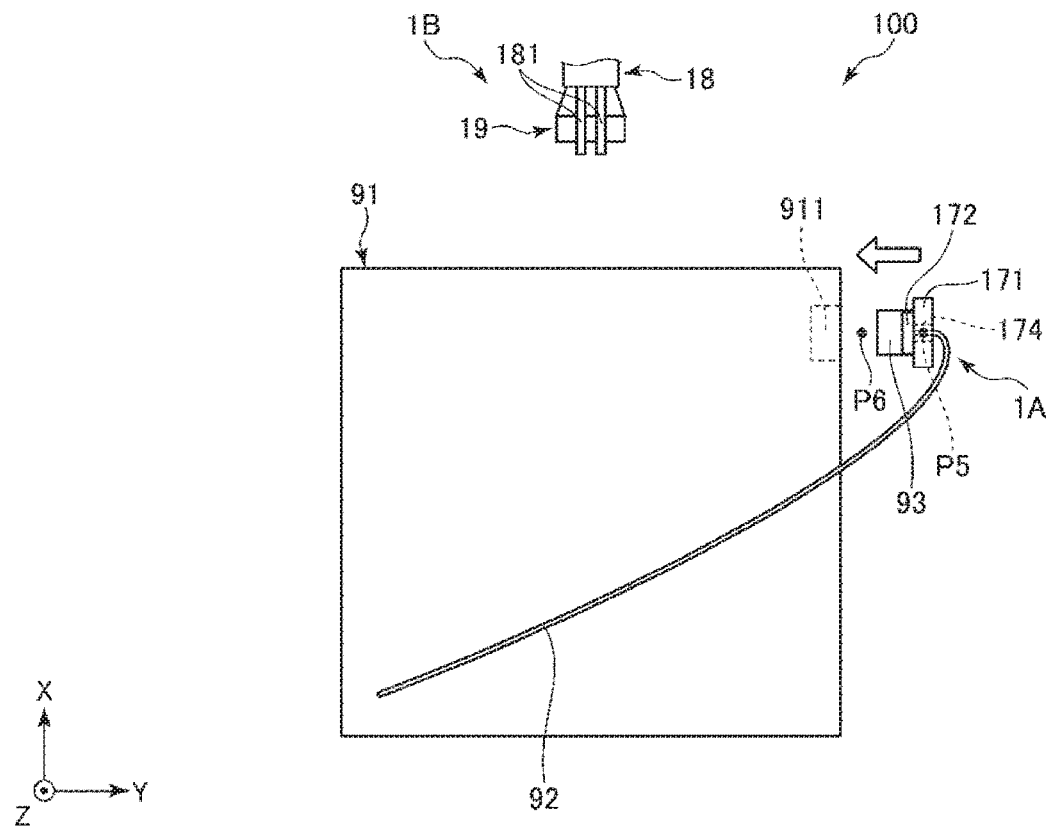
FIG. 23 is a plan view for explaining the operation state of the robot system shown in FIG. 1.
Figure 24:
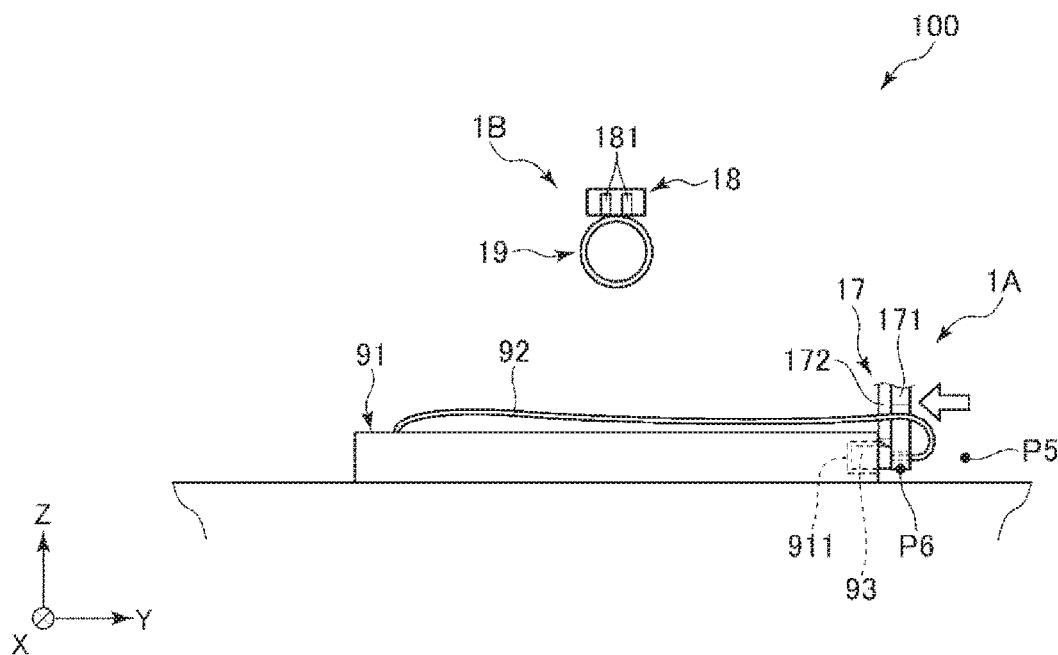
FIG. 24 is a side view for explaining the operation state of the robot system shown in FIG. 1.

As shown in FIGS. 23 and 24, the hand 17 is moved to a position P6 set between the position P5 and the insertion hole 911. The movement of the hand 17 to the position P5 and the position P6 is performed by the position control. However, after moving to the position P6, the hand 17 is moved to the insertion hole 911 side by the force control. When a force applied to the hand 17 when the insertion of the connector 93 into the insertion hole 911 is completed, that is, a force detected by the force detecting section 120 reaches a predetermined value, the movement of the hand 17 is stopped.

The predetermined value used in this step is a value stored in the storing section 52 in advance. The predetermined value is a value different from the value used to detect the contact of the hand 17 and the connector 93 when the second gripping is performed as explained above.

Figure 25:
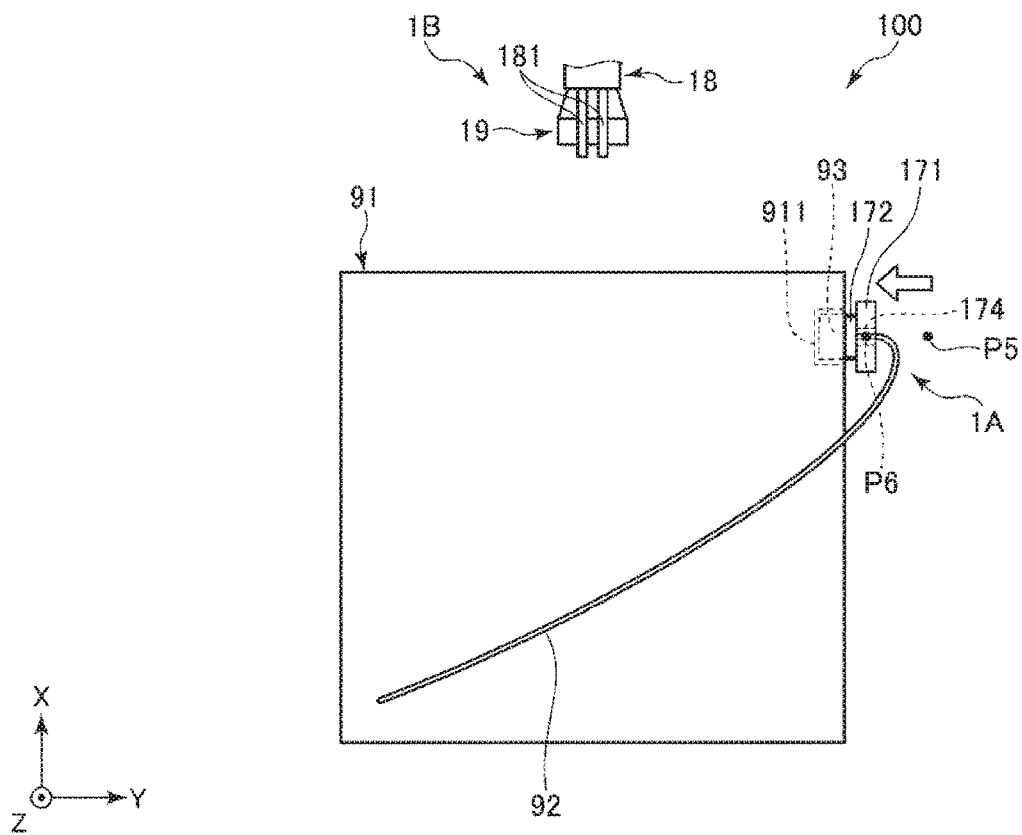
FIG. 25 is a plan view for explaining the operation state of the robot system shown in FIG. 1.

As shown in FIG. 25, the insertion of the connector 93 into the insertion hole 911 is completed through the steps explained above.

[8] Fixing Step

Figure 26:
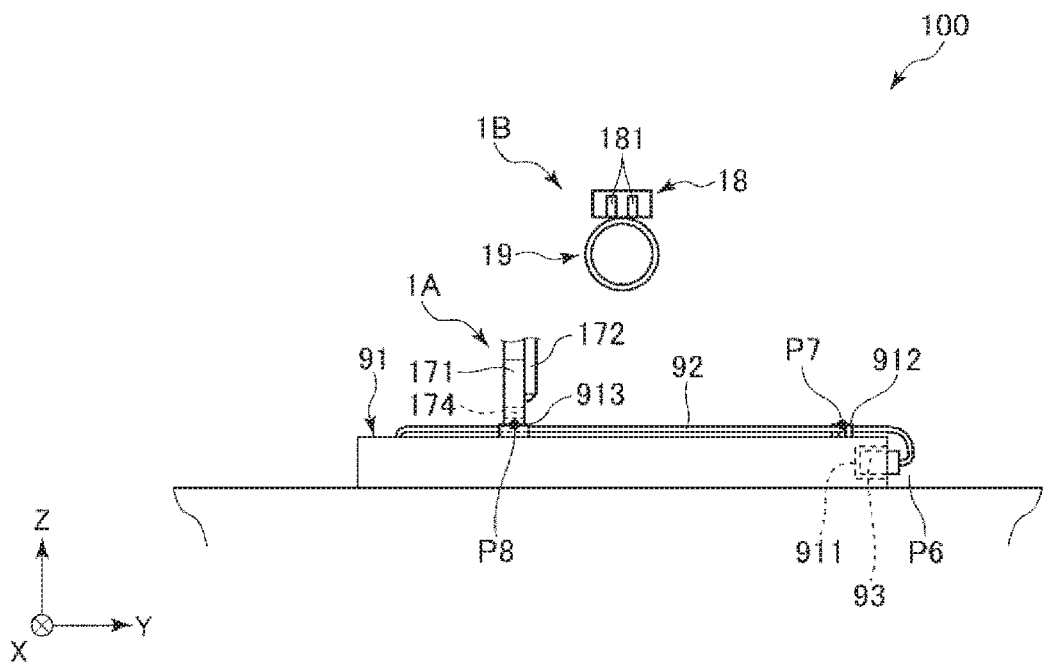
FIG. 26 is a side view for explaining the operation state of the robot system shown in FIG. 1.
Figure 27:
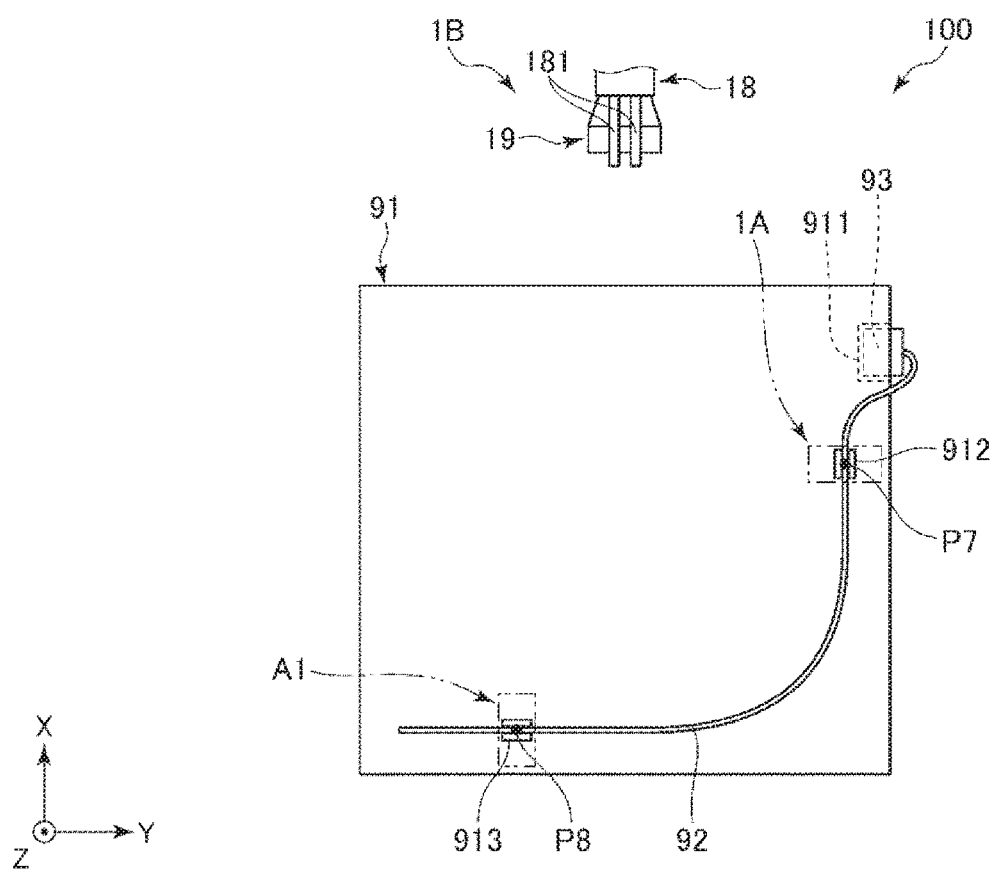
FIG. 27 is a plan view for explaining the operation state of the robot system shown in FIG. 1.

The fixing step is a step of fixing a halfway part in the longitudinal direction of the cable 92 to the substrate 91 as shown in FIGS. 26 and 27. In this embodiment, two parts in the longitudinal direction of the cable 92 are fixed to the substrate 91. A fixing section 912 and a fixing section 913 are provided in the substrate 91. The fixing section 912 and the fixing section 913 are, for example, grooves or a pair of protrusions.

A position P7 is set in the fixing section 912. A position P8 is set in the fixing section 913. The position P7 and the position P8 are coordinates stored in the storing section 52 in advance. The coordinates may be input by the operator or may be coordinates specified based on an image captured by the imaging section 19 in advance.

As shown in FIG. 27, the hand 17 is moved to the position P7, whereby the tip of the hand 17 can press the cable 92 against the fixing section 912 and fix the cable 92. Thereafter, the hand 17 is moved to the position P8, whereby the tip of the hand 17 can press the cable 92 against the fixing section 913 and fix the cable 92.

As shown in FIG. 27, the connector 93 is inserted into the insertion hole 911 through the steps explained above and the halfway part in the longitudinal direction of the cable 92 can be fixed to the substrate 91. The work of the robot system 100 is completed.

As explained above, the robot system 100 includes the robot 1A including the robot arm 10, which is the arm, the control section 51 that controls the operation of the robot 1A, the hand 17, which is the gripping section that is coupled to the robot arm 10 and grips the cable 92, at one end of which the connector 93 is provided, and the force detecting section 120, which is the detecting section that detects the contact of the hand 17 and the connector 93. The control section 51 causes the hand 17 to perform the first gripping for gripping the cable 92 to restrict the movement of the cable 92 in the thickness direction of the cable 92, moves the hand 17 toward the connector 93 in a state in which the first gripping is performed, stops the movement of the hand 17 based on a detection result of the force detecting section 120, and causes the hand 17 to perform the second gripping for gripping the connector 93.

The control method for the robot system 100 is the control method for the robot system 100 including the robot 1A including the robot arm 10, which is the arm, the hand 17, which is the gripping section that is coupled to the robot arm 10 and grips the cable 92, at one end of which the connector 93 is provided, and the force detecting section 120, which is the detecting section that detects the contact of the hand 17 and the connector 93. The control method includes the step of causing the hand 17 to perform the first gripping for gripping the cable 92 to restrict the movement of the cable 92 in the thickness direction of the cable 92, the step of moving the hand 17 toward the connector 93 in a state in which the first gripping is performed, the step of stopping the movement of the hand 17 based on a detection result of the force detecting section 120, and the step of causing the hand 17 to perform the second gripping for gripping the connector 93.

According to the present disclosure explained above, as explained above, it is possible to accurately grip the connector without the necessity of performing the complicated processing in the past with a simple method in which the hand 17 sequentially performs the first gripping and the second gripping. Consequently, according to the present disclosure, it is possible to easily and accurately grip the connector.

Second Embodiment

A robot system according to a second embodiment of the present disclosure is explained with reference to FIG. 28. Differences from the first embodiment are mainly explained. Explanation of similarities is omitted.

Figure 28:
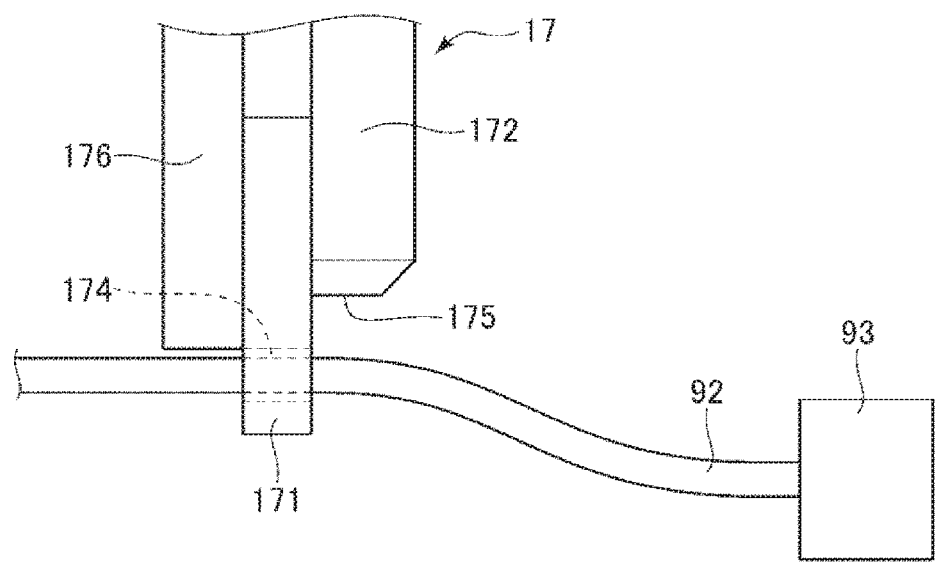
FIG. 28 is a diagram showing a gripping section of a robot included in a robot system according to a second embodiment.

As shown in FIG. 28, in this embodiment, the hand includes plate-like or block-like guide pieces 176 provided on the opposite side of the posture adjusting sections 172 of the clamping pieces 171. The guide pieces 176 have a function of guiding the cable 92 to between the clamping pieces 171 while coming into contact with the cable 92 and adjusting the posture of the cable 92 when the hand 17 performs the first gripping.

According to this embodiment, the same effects as the effects in the first embodiment are obtained. Further, it is possible to more stably perform the first gripping.

Other Configuration Examples of the Robot System

Figure 29:
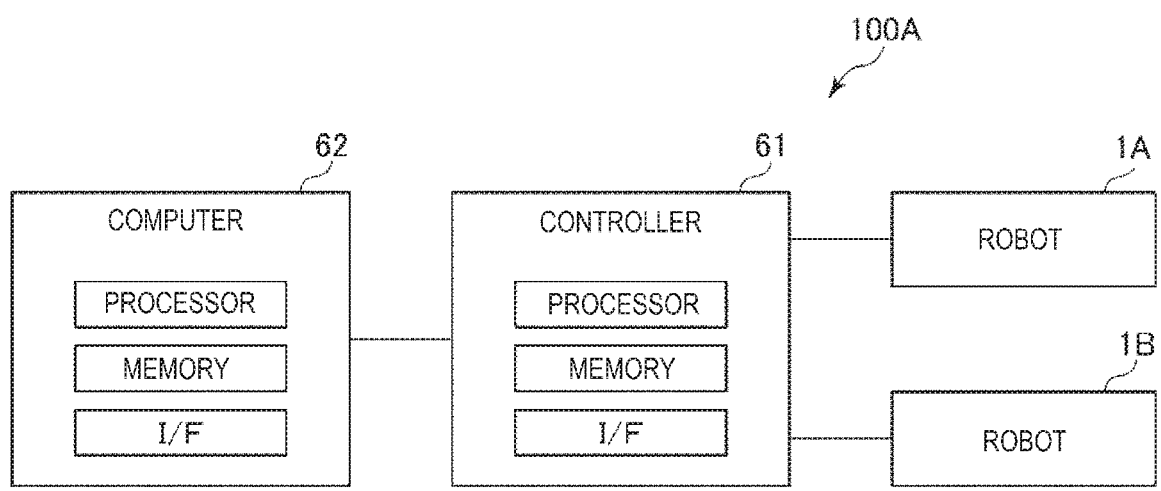
FIG. 29 is a block diagram for explaining a robot system centering on hardware.

FIG. 29 is a block diagram for explaining a robot system centering on hardware.

FIG. 29 shows the overall configuration of a robot system 100A in which the robot 1A and the robot 1B, a controller 61, and a computer 62 are coupled. Control of the robot 1A and the robot 1B may be executed by reading out a command present in a memory with a processor present in the controller 61 or may be executed via the controller 61 by reading out the command present in the memory with a processor present in the computer 62.

Therefore, one or both of the controller 61 and the computer 62 can be grasped as a "control device".

Modification 1

Figure 30:
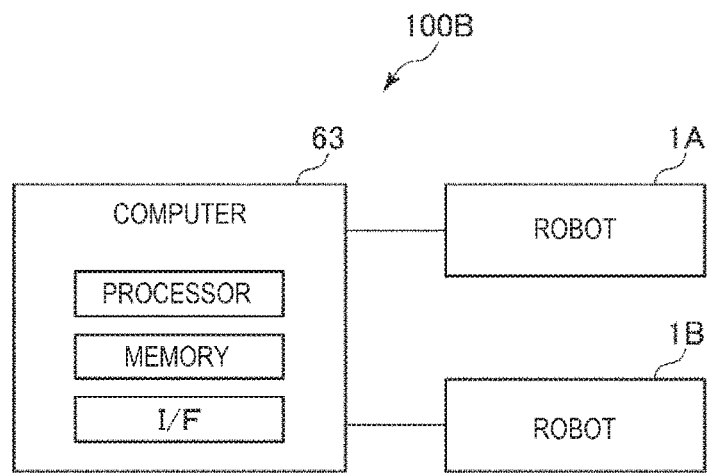
FIG. 30 is a block diagram showing a modification 1 centering on the hardware of the robot system.

FIG. 30 is a block diagram showing a modification 1 centering on hardware of a robot system.

FIG. 30 shows the overall configuration of a robot system 100B in which a computer 63 is directly coupled to the robot 1A and the robot 1B. Control of the robot 1A and the robot 1B is directly executed by reading out a command present in a memory with a processor present in the computer 63.

Therefore, the computer 63 can be grasped as a "control device".

Modification 2

Figure 31:
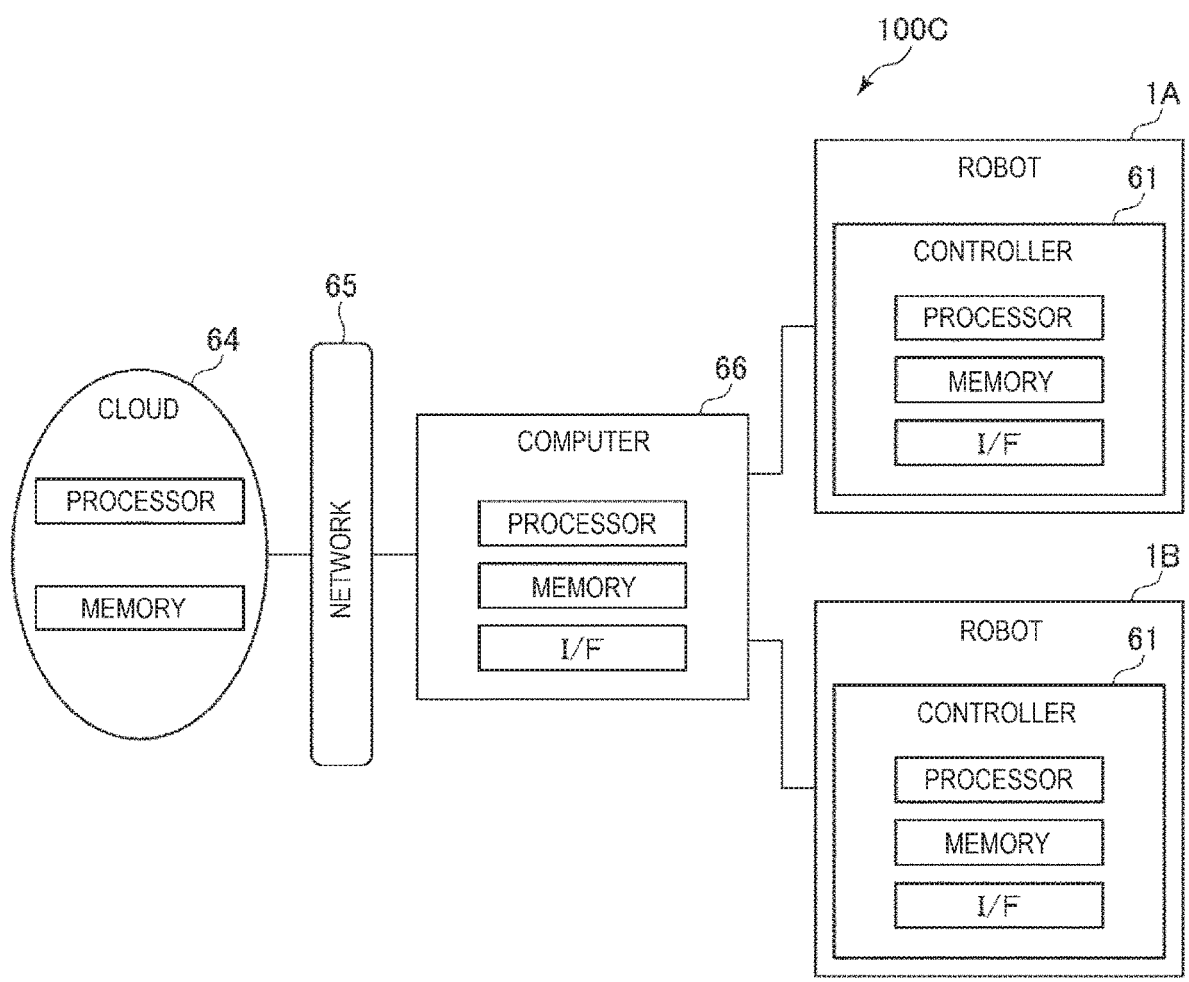
FIG. 31 is a block diagram showing a modification 2 centering on the hardware of the robot system.

FIG. 31 is a block diagram showing a modification 2 centering on hardware of a robot system.

FIG. 31 shows the overall configuration of a robot system 100C in which the robot 1A and the robot 1B incorporating controllers 61 and a computer 66 are coupled and the computer 66 is connected to cloud 64 via a network 65 such as a LAN. Control of the robot 1A and the robot 1B may be executed by reading out a command present in a memory with a processor present in the computer 66 or may be executed by reading out the command present in the memory with a processor prevent on the cloud 64 via the computer 66.

Therefore, any one, any two, or three of the controller 61, the computer 66, and the cloud 64 can be grasped as a "control device".

The robot system and the control method according to the present disclosure are explained above based on the embodiments shown in the figures. However, the present disclosure is not limited to this. The components of the sections can be replaced with any components having the same functions. Any other components may be added to the present disclosure. The embodiments may be combined as appropriate.

In the embodiments explained above, the so-called six-axis vertical articulated robot is illustrated as the robot included in the robot system according to the present disclosure. However, the robot may be other robots such as a SCARA robot. The robot is not limited to the single-arm robot and may be other robots such as a double-arm robot. Therefore, the number of movable sections is not limited to one and may be two or more. The number of arms included in the robot arm included in the movable section is six in the embodiments explained above. However, the number of arms may be one to five or seven or more.

What is claimed is:

1. A robot system comprising:
   a robot;
   a first arm and a second arm of the robot;
   a first gripper coupled to the first arm, the first gripper having first and second claws that have a first open state and a first closed state to release and hold a cable, respectively, the cable having a connector at one end thereof, the first and second claws having a through opening therein in the first closed state, the cable being configured to pass through the through opening, the connector having first and second ends outwardly opposite to each other;
   a second gripper coupled to the second arm, the second gripper having first and second clamping pieces that have a second open state and a second closed state to release and hold the second end of the connector, respectively;
   a force sensor configured to detect an external force applied to the first gripper and output detection information corresponding to the detected external force, the force sensor being provided at the first arm;
   an imaging sensor configured to capture an image of a posture of the connector;
   a memory configured to store a program; and
   a processor configured to execute the program so as to:
   cause the first gripper to hold the cable in the through opening;
   move the first gripper toward the first end of the connector while the first gripper holds the cable;
   stop the movement of the first gripper when the processor determines that the detection information corresponds to a predetermined force;
   cause the first gripper to restrict movement or rotation of the connector via a restricting surface of the first gripper when the processor stops the movement of the first gripper, wherein the restricting surface faces downward along a first extending direction of the first and second claws, the first extending direction is substantially perpendicular to a second extending direction of the cable from the connector, and the restricting surface faces and contacts a surface of the connector to restrict the movement or the rotation of the connector;
   determine whether the posture of the connector is a predetermined posture based on the captured image when the first gripper restricts the movement or the rotation of the connector;
   determine a required rotation angle to correct the posture of the connector based on the captured image when the processor determines that the posture of the connector is not the predetermined posture;
   cause the second gripper to clamp the second end of the connector via the first and second clamping pieces while the first gripper restricts the movement or the rotation of the connector when the processor determines that the posture of the connector is not the predetermined posture;
   move the first gripper away from the first end of the connector after the second gripper clamps the connector;
   rotate the second gripper around the second extending direction by the required rotation angle while the second gripper clamps the connector after the first gripper moves away from the first end of the connector;
   move the first gripper toward the first end of the connector, stop the movement of the first gripper when the processor determines that the detection information corresponds to the predetermined force, and restrict the movement or the rotation of the connector while the second gripper clamps the connector after the second gripper rotates by the required rotation angle;
   cause the first and second clamping pieces to release the second end of the connector and move the second gripper away from the connector after the first gripper restricts the movement or the rotation of the connector; and
   move the first gripper toward an insertion hole and insert the second end of the connector into the insertion hole while the first gripper restricts the movement or the rotation of the connector.

2. The robot system according to claim 1, wherein another end of the cable is a fixed end that is fixed, and
a distance from the one end of the cable to a first point of the cable where the first gripper initially holds the cable is larger than a distance from the other end of the cable to the first point of the cable.

3. The robot system according to claim 1,
wherein, when viewed along the second extending direction, one of the first claw or the second claw and the connector overlap.

4. The robot system according to claim 1,
wherein the processor is configured to perform position control when the processor is configured to move the first gripper toward the connector while the first gripper holds the cable.

5. A control method for causing a processor to execute a process, the control method comprising executing on the processor the steps of:
causing a first gripper to hold a cable in a through opening of the first gripper, the first gripper being coupled to a first arm of a robot, the first gripper having first and second claws that have a first open state and a first closed state to release and hold the cable, respectively, the cable having a connector at one end thereof, the first and second claws having the through opening therein in the first closed state, the cable being configured to pass through the through opening, the connector having first and second ends outwardly opposite to each other;
causing a force sensor to detect an external force applied to the first gripper and output detection information corresponding to the detected external force, the force sensor being provided at the first arm;
moving the first gripper toward the first end of the connector while the first gripper holds the cable;
stopping the movement of the first gripper when the processor determines that the detection information corresponds to a predetermined force;
causing the first gripper to restrict movement or rotation of the connector via a restricting surface of the first gripper when the processor stops the movement of the first gripper, wherein the restricting surface faces downward along a first extending direction of the first and second claws, the first extending direction is substantially perpendicular to a second extending direction of the cable from the connector, and the restricting surface faces and contacts a surface of the connector to restrict the movement or the rotation of the connector;
determining whether a posture of the connector is a predetermined posture based on an image captured by an image sensor when the first gripper restricts the movement or the rotation of the connector;
determining a required rotation angle to correct the posture of the connector based on the captured image when the processor determines that the posture of the connector is not the predetermined posture;
causing a second gripper having first and second clamping pieces to clamp the second end of the connector via the first and second clamping pieces while the first gripper restricts the movement or the rotation of the connector when the processor determines that the posture of the connector is not the predetermined posture, the second gripper being coupled to a second arm of the robot, the first and second clamping pieces having a second open state and a second closed state to release and hold the second end of the connector, respectively;
moving the first gripper away from the first end of the connector after the second gripper clamps the connector;
rotating the second gripper around the second extending direction by the required rotation angle while the second gripper clamps the connector after the first gripper moves away from the first end of the connector;
moving the first gripper toward the first end of the connector, stop the movement of the first gripper when the processor determines that the detection information corresponds to the predetermined force, and restrict the movement or the rotation of the connector while the second gripper clamps the connector after the second gripper rotates by the required rotation angle;
causing the first and second clamping pieces to release the second end of the connector and move the second gripper away from the connector after the first gripper restricts the movement or the rotation of the connector; and
moving the first gripper toward an insertion hole and insert the second end of the connector into the insertion hole while the first gripper restricts the movement or the rotation of the connector.

6. The control method according to claim 5,
wherein the processor is configured to perform position control when the processor is configured to move the first gripper toward the connector while the first gripper holds the cable.

* * * * *